US012354546B2

(12) United States Patent
Zhai

(10) Patent No.: US 12,354,546 B2
(45) Date of Patent: Jul. 8, 2025

(54) PIXEL CIRCUIT, DRIVER CIRCUIT, DISPLAY PANEL, AND DISPLAY APPARATUS

(71) Applicant: Tianma Advanced Display Technology Institute (Xiamen) Co., Ltd., Xiamen (CN)

(72) Inventor: Yingteng Zhai, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/399,835

(22) Filed: Dec. 29, 2023

(65) Prior Publication Data

US 2024/0135878 A1 Apr. 25, 2024
US 2024/0233641 A9 Jul. 11, 2024

(30) Foreign Application Priority Data

Sep. 7, 2023 (CN) ........................ 202311152388.2

(51) Int. Cl.
*G09G 3/3233* (2016.01)

(52) U.S. Cl.
CPC ... *G09G 3/3233* (2013.01); *G09G 2300/0852* (2013.01); *G09G 2300/0861* (2013.01); *G09G 2310/0286* (2013.01); *G09G 2310/061* (2013.01); *G09G 2310/08* (2013.01); *G09G 2320/045* (2013.01); *G09G 2320/0626* (2013.01)

(58) Field of Classification Search
CPC ......... G09G 3/3233; G09G 2300/0852; G09G 2300/0861; G09G 2310/0286; G09G 2310/061; G09G 2310/08; G09G 2320/045; G09G 2320/0626
See application file for complete search history.

(56) References Cited

U.S. PATENT DOCUMENTS

| | | | | |
|---|---|---|---|---|
| 2020/0365078 | A1* | 11/2020 | Zhai | G09G 3/3233 |
| 2021/0005144 | A1* | 1/2021 | Long | G09G 3/3233 |
| 2022/0215797 | A1* | 7/2022 | Zhai | G09G 3/3225 |
| 2022/0246088 | A1* | 8/2022 | Zhai | G09G 3/32 |

* cited by examiner

*Primary Examiner* — Ariel A Balaoing
(74) *Attorney, Agent, or Firm* — KDW Firm PLLC

(57) ABSTRACT

Provided are a pixel circuit, a driver circuit, a display panel, and a display apparatus. The pixel circuit includes a first-type switch transistor and a second-type switch transistor. A gate of the first-type switch transistor receives a first-type control signal. The first-type control signal includes a first high level and a first low level. A gate of the second-type switch transistor receives a second-type control signal. The second-type control signal includes a second high level and a second low level. The first high level is not equal to the second high level, and/or the first low level is not equal to the second low level, thereby implementing the accurate control of transistors and improving circuit stability.

18 Claims, 17 Drawing Sheets

PIXEL CIRCUIT, DRIVER CIRCUIT, DISPLAY PANEL, AND DISPLAY APPARATUS

CROSS-REFERENCE TO RELATED APPLICATION(S)

This application claims priority to Chinese Patent Application No. 202311152388.2 filed Sep. 7, 2023, the disclosure of which is incorporated herein by reference in its entirety.

TECHNICAL FIELD

The present application relates to the field of display technology and, in particular, to a pixel circuit, a driver circuit, a display panel, and a display apparatus.

BACKGROUND

A display panel includes a plurality of pixel circuits. A pixel circuit is configured to supply a drive current to a light-emitting element to make the light-emitting element emit light. The pixel circuit includes a plurality of transistors. Different transistors are located in different positions and play different functions. The pixel circuit can complete different working phases through the cooperation of various transistors.

SUMMARY

Given that, the present application provides a pixel circuit, a driver circuit, a display panel, and a display apparatus.

An embodiment of the present application provides a pixel circuit. The pixel circuit includes a first-type switch transistor and a second-type switch transistor. A gate of the first-type switch transistor is configured to receive a first-type control signal. The first-type control signal includes a first high level and a first low level. A gate of the second-type switch transistor is configured to receive a second-type control signal. The second-type control signal includes a second high level and a second low level. The first high level is not equal to the second high level, and/or the first low level is not equal to the second low level.

The present application further provides a driver circuit configured to supply a control signal to a pixel circuit. The driver circuit includes a first-type driver circuit, a second-type driver circuit, a first-type high level line, a first-type low level line, a second-type high level line, and a second-type low level line. The first-type driver circuit is configured to supply a first-type control signal to the pixel circuit, where the first-type control signal includes a first high level and a first low level. The second-type driver circuit is configured to supply a second-type control signal to the pixel circuit, where the second-type control signal includes a second high level and a second low level. The first-type high level line is electrically connected to the first-type driver circuit and configured to supply the first high level to the first-type driver circuit. The first-type low level line is electrically connected to the first-type driver circuit and configured to supply the first low level to the first-type driver circuit. The second-type high level line is electrically connected to the second-type driver circuit and configured to supply the second high level to the second-type driver circuit. The second-type low level line is electrically connected to the second-type driver circuit and configured to supply the second low level to the second-type driver circuit. The first high level is not equal to the second high level, and/or the first low level is not equal to the second low level.

An embodiment of the present application further provides a display panel including a pixel circuit and a driver circuit according to any embodiment of the present application.

An embodiment of the present application further provides a display apparatus. The display device includes a display panel according to any embodiment of the present application.

BRIEF DESCRIPTION OF DRAWINGS

To illustrate the technical solutions in the embodiments of the present application or the technical solutions in the existing art more clearly, drawings used in the description of the embodiments or the existing art will be briefly described below. Apparently, the drawings described below are merely embodiments of the present application, and those skilled in the art may obtain other drawings based on provided drawings on the premise that no creative work is done.

DETAILED DESCRIPTION

Figure 1:
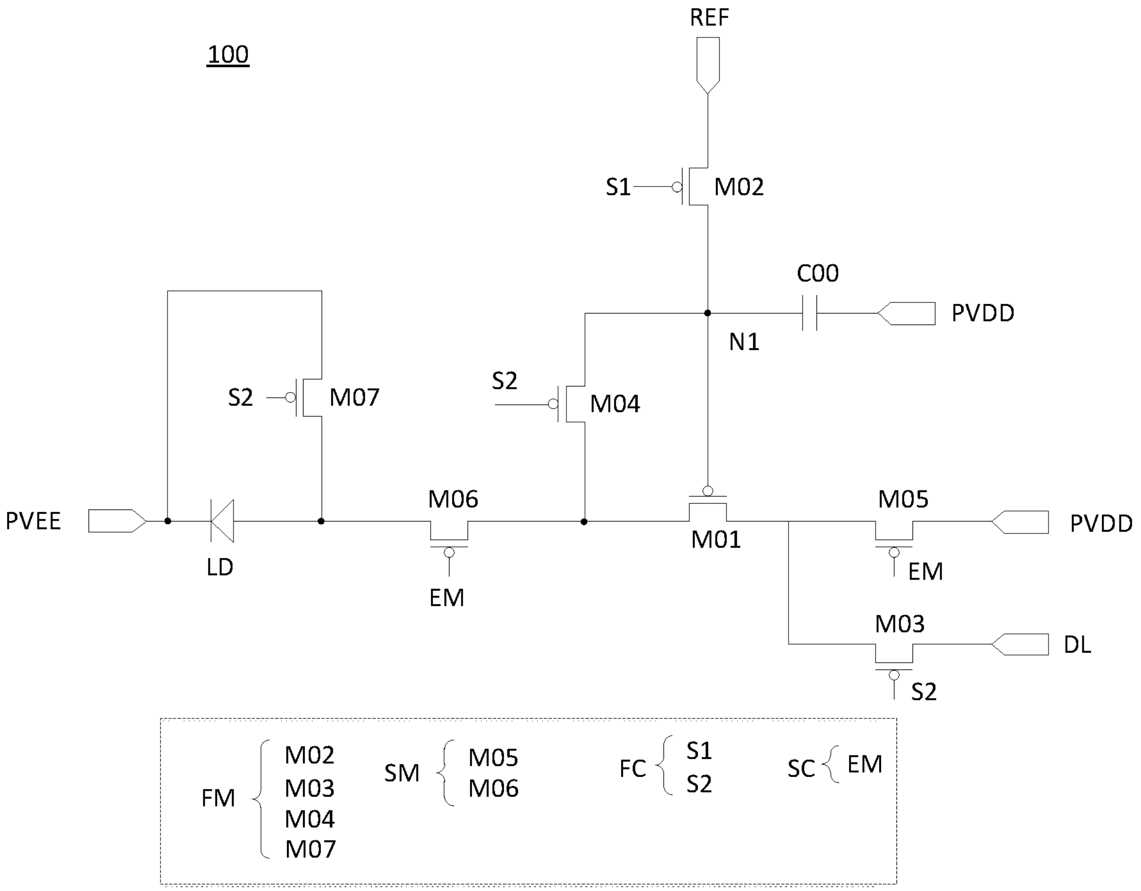
FIGS. 1 to 6 are pixel circuit diagrams according to embodiments of the present application.

The solutions in embodiments of the present application will be described clearly and completely in conjunction with the drawings in the embodiments of the present application. Apparently, the embodiments described below are part, not all, of the embodiments of the present application. Based on embodiments of the present application, all other embodiments obtained by those skilled in the art without creative work are within the scope of the present application.

Unless otherwise specified, same reference numerals in different drawings denote same structures or denote structures having same functions. Same structures in various drawings and corresponding description content may be referred to each other.

Unless otherwise specified, same structures in different drawings may be replaced with each other to form an embodiment.

Features in drawings may be combined in the case of no contradiction to form other embodiments.

A first end of a transistor mentioned in the present application may refer to one of a source of the transistor or a drain of the transistor, and a second end of the transistor may refer to the other of the source of the transistor or the drain of the transistor.

In the present application, when a signal port and a signal supplied by the signal port use the same reference numeral, the reference numeral, when being used for denoting the signal, denotes the voltage value of the signal.

The "connection" mentioned in the present application may be understood as direct connection or coupling.

For a drawing including a plurality of dashed box conditions, one or more dashed boxes may be combined with a main part of the drawing to form an embodiment.

The present application provides a pixel circuit. The pixel circuit includes a first-type switch transistor and a second-type switch transistor. A gate of the first-type switch transistor receives a first-type control signal. The first-type control signal includes a first high level and a first low level. A gate of the second-type switch transistor receives a second-type control signal. The second-type control signal includes a second high level and a second low level. The first high level is not equal to the second high level, and/or the first low level is not equal to the second low level. In the pixel circuit provided in the present application, at least two types of different control signals are arranged to implement the accurate control of transistors and improve the stability of circuit operation.

FIG. 1 is a pixel circuit diagram according to an embodiment of the present application. By way of example, transistors in FIG. 1 are each a p-type transistor.

A pixel circuit 100 includes transistors M01 to M07 and a capacitor C00. A transistor M01 is a drive transistor for generating a drive current according to the voltage of a drive end and a data signal supplied by a data line DL to drive a light-emitting element LD to emit light.

A transistor M02 receives a scan signal S1 and transmits a voltage REF to a gate of the transistor M01 for resetting.

A transistor M03 and a transistor M04 write data signals to the gate of the transistor M01 in the control of a scan signal S2.

A transistor M05 and a transistor M06 turn on a current driving path in the control of a light emission control signal EM.

A transistor M07 resets the light-emitting element LD in the control of the scan signal S2.

A first-type switch transistor FM in the pixel circuit 100 may include one or more of the transistor M02, the transistor M03, the transistor M04, or the transistor M07. A second-type switch transistor SM may include one or more of the transistor M05 and the transistor M06. A gate of the first-type switch transistor FM receives a first-type control signal FC (for example, S1 and S2). The first-type control signal FC includes a first high level FH and a first low level FL. A gate of the second-type switch transistor SM receives a second-type control signal SC (for example, EM). The second-type control signal SC includes a second high level SH and a second low level SL. The first high level FH is not equal to the second high level SH, and/or the first low level FL is not equal to the second low level SL, helping implement the accurate control of different transistors and improving the working stability of the pixel circuit 100.

According to one or more embodiments of the present application, the material of an active layer of the first-type switch transistor FM may be the same as the material of an active layer of the second-type switch transistor SM. For example, the material of an active layer may include silicon. Illustratively, the active layer may include one or more of low-temperature polycrystalline silicon (LTPS), amorphous silicon, or monocrystalline silicon; or, the material of the active layer may include a semiconductor including an oxide, for example, indium gallium zinc oxide.

The active layer of a transistor may include a channel area, a source area, and a drain area. The source area and the drain area are located on two sides of the channel area.

The active layer of the first-type switch transistor FM and the active layer of the second-type switch transistor SM may be disposed in the same layer. The first-type switch transistor FM and the second-type switch transistor SM may be manufactured in the same process.

According to one or more embodiments of the present application, the first-type switch transistor FM and the second-type switch transistor SM that are in the pixel circuit 100 may be each a p-type transistor or may be each an n-type transistor.

Figure 2:
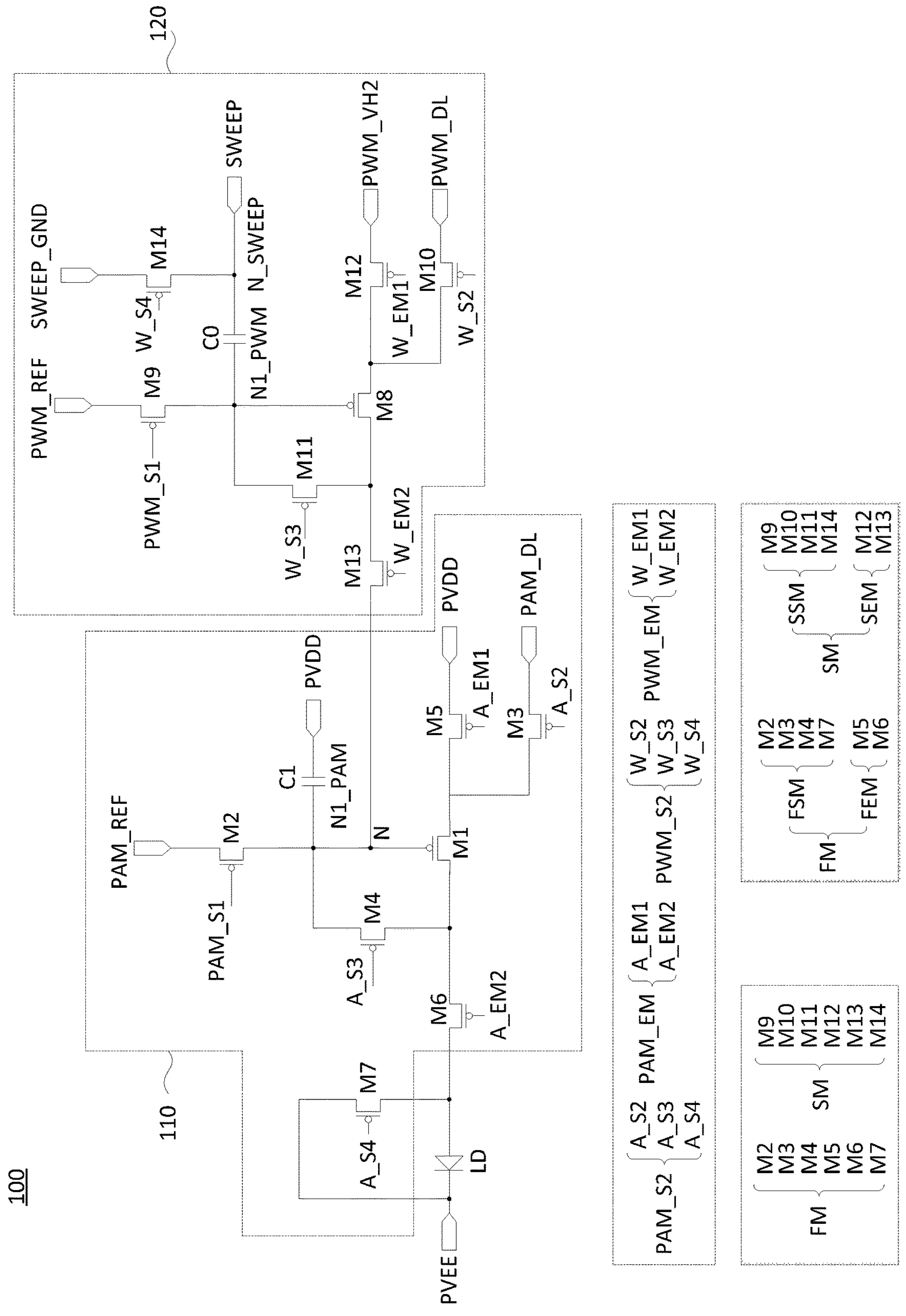

FIG. 2 is a pixel circuit diagram according to an embodiment of the present application. By way of example, transistors in FIG. 2 are each a p-type transistor. The circuit connection manner in which the transistors are each an n-type transistor may be adjusted according to the circuit connection relationship.

The pixel circuit 100 includes a current driving circuit 110 and a pulse width modulation circuit 120.

According to one or more embodiments of the present application, the current driving circuit 110 may include a first-type switch transistor FM and a second-type switch transistor SM. The first-type switch transistor FM may include a first-type scan transistor described hereinafter. The second-type switch transistor SM may include a first-type light emission control transistor described hereinafter.

According to one or more embodiments of the present application, the pulse width modulation circuit 120 may include a first-type switch transistor FM and a second-type switch transistor SM. The first-type switch transistor FM may include a second-type scan transistor described hereinafter. The second-type switch transistor SM may include a second-type light emission control transistor described hereinafter.

According to one or more embodiments of the present application, the current driving circuit 110 may include a first-type switch transistor FM, and the pulse width modulation circuit 120 may include a second-type switch transistor SM.

The current driving circuit 110 is configured to supply a drive current to a light-emitting element LD. The light emission efficiency of the light-emitting element LD may vary with the drive current. The drive current may be a constant drive current so as to drive the light-emitting element LD with the improved or optimized light emission efficiency.

The pulse width modulation circuit 120 is configured to control the light emission duration of the light-emitting element LD based on pulse width data PWM_DATA and a sweep signal SWEEP. Illustratively, the pulse width modulation circuit 120 may control the duration of the drive current provided to the light-emitting element LD by the current driving circuit 110 based on the pulse width data PWM_DATA and the sweep signal SWEEP, thereby controlling the light emission duration of the light-emitting element LD. The brightness of the light emitted by the light-emitting element LD is controlled by controlling the light emission duration of the light-emitting element LD (that is, adjusting a duty cycle of the light-emitting element LD).

The light-emitting element LD includes, for example, an inorganic light-emitting diode and an organic light-emitting diode.

The current driving circuit 110 may include a first drive transistor, a first reset transistor, a drive data write circuit, a first light emission control circuit, a third reset transistor, and a first storage capacitor.

The first drive transistor M1 is connected in series between a first drive voltage end PVDD and the light-emitting element LD. The first drive transistor M1 may generate the drive current based on drive data PAM_DATA and a first drive voltage PVDD supplied by the first drive voltage end PVDD to drive the light-emitting element LD to emit light. The drive data PAM_DATA with the same voltage value may be supplied to the first drive transistor M1 to generate the constant drive current. It is to be noted that for pixel circuits 100 that are connected to light-emitting elements LD with different colors, the drive data PAM_DATA with different voltage values may be supplied to first drive transistors M1 of the pixel circuits 100.

A first end of the first reset transistor M2 is connected to the first reset voltage end PAM_REF. A second end of the first reset transistor M2 is connected to a gate of the first drive transistor M1 (or the second end of the first reset transistor M2 is connected to the gate of the first drive transistor M1 at a node N1_PAM). A gate of the first reset transistor M2 receives a first reset scan signal PAM_S1. In the control of the first reset scan signal PAM_S1, the first reset transistor M1 is turned on so that a first reset voltage PAM_REF supplied by the first reset voltage end is transmitted PAM_REF to the gate of the first drive transistor M1 to reset the potential of the gate of the first drive transistor M1.

The drive data write circuit includes a drive data write transistor M3 and a first compensation transistor M4. A first end of the drive data write transistor M3 is connected to a drive data line PAM_DL. A second end of the drive data write transistor M3 is connected to a first end of the first drive transistor M1. A gate of the drive data write transistor M3 receives a first data write scan signal A_S2. In the control of the first data write scan signal A_S2, the drive data write transistor M3 is turned on so that the drive data PAM_DATA supplied by the drive data line PAM_DL is transmitted to the first end of the first drive transistor M1. A first end of the first compensation transistor M4 is connected to a second end of the first drive transistor M1. A second end of the first compensation transistor M4 is connected to the gate of the first drive transistor M1. A gate of the first compensation transistor M4 receives a first compensation scan signal A_S3. In the control of the first compensation scan signal A_S3, the first compensation transistor M4 is turned on so that the second end of the first drive transistor M1 communicates with the gate of the first drive transistor M1, enabling the first drive transistor M1 to be connected in a diode manner. The drive data write transistor M3 and the first compensation transistor M4 that are in the drive data write circuit may be turned on in the control of the same control signal PAM_S2 so that the drive data PAM_DATA supplied by the drive data line PAM_DL is transmitted to the gate of the first drive transistor M1. A threshold voltage Vth1 of the first drive transistor M1 is supplied to the gate of the first drive transistor M1 in a self-compensation manner to eliminate the effect of the threshold voltage Vth1 of the first drive transistor M1 on the magnitude of the drive current generated by the first drive transistor M1.

The first light emission control circuit includes a first light emission control transistor M5 and a second light emission control transistor M6. The first light emission control transistor M5 is connected in series between the first drive voltage end PVDD and the first drive transistor M1. A first end of the first light emission control transistor M5 is connected to the first drive voltage end PVDD. A second end of the first light emission control transistor M5 is connected to the first end of the first drive transistor M1. A gate of the first light emission control transistor M5 receives a first light emission control signal A_EM1. In the control of the first light emission control signal A_EM1, the first light emission control transistor M5 is turned on so that the first drive voltage PVDD supplied by the first drive voltage end PVDD is transmitted to the first end of the first drive transistor M1. The second light emission control transistor M6 is connected in series between the first drive transistor M1 and the light-emitting element LD. A first end of the second light emission control transistor M6 may be connected to the second end of the first drive transistor M1. A second end of the second light emission control transistor M6 is connected to the light-emitting element LD. For example, the second end of the second light emission control transistor M6 is connected to an anode of the light-emitting element LD. A gate of the second light emission control transistor M6 receives a second light emission control signal A_EM2. In the control of the second light emission control signal A_EM2, the second light emission control transistor M6 is turned on so that the path between the first drive transistor M1 and the light-emitting element LD is conductive. The first light emission control transistor M5 and the second light emission control transistor M6 that are in the first light emission control circuit may be turned on in the control of the same control signal PAM_EM to enable the conduction of the drive current path between the first drive voltage end PVDD and the light-emitting element LD.

A first end of the third reset transistor M7 is connected to a third reset voltage end PVEE. The third reset voltage end and a third drive voltage end may be the same voltage end PVEE. A second end of the third reset transistor M7 is connected to a first electrode of the light-emitting element LD (for example, the anode of the light-emitting element LD). A gate of the third reset transistor M7 receives a third reset scan signal A_S4. In the control of the third reset scan signal A_S4, the third reset transistor M7 is turned on so that a third reset voltage PVEE supplied by the third reset voltage end PVEE is transmitted to the first electrode of the light-emitting element LD, thereby resetting the potential of the first electrode of the light-emitting element LD. The first electrode of the light-emitting element LD is an electrode connected to the first light emission control circuit. As shown in FIG. 2, the third reset scan signal and the first data write scan signal may be the same scan signal PAM_S2. In other embodiments, the third reset scan signal and the first reset scan signal may be the same scan signal PAM_S1.

The first storage capacitor C1 is connected between the first drive voltage end PVDD and the gate of the first drive transistor M1 (or the node N1_PAM) for receiving the drive data PAM_DATA written to the gate of the first drive transistor M1 and for maintaining the potential of the gate of the first drive transistor M1 so that the first drive transistor M1 can supply the constant drive current continuously.

The pulse width modulation circuit 120 may include a second drive transistor, a second reset transistor, a pulse width data write circuit, a second light emission control circuit, a second storage capacitor, and a sweeping transistor.

The second drive transistor M8 is connected in series between a second drive voltage end PWM_VH2 and a connection node N for transmitting a second drive voltage PWM_VH2 supplied by the second drive voltage end PWM_VH2 to the connection node N. The connection node N is a connection node between the pulse width modulation circuit 120 and the current driving circuit 110. The second drive voltage PWM_VH2 supplied by the second drive voltage end PWM_VH2 is transmitted through the second drive transistor M8 and the connection node N to the current driving circuit 110 to control the on and off of the drive current transmission path of the current driving circuit 110, thereby controlling the duration of the drive current supplied by the current driving circuit 110.

As shown in the figure, the connection node N is connected to the gate of the first drive transistor M1 (or the connection node N is the gate of the first drive transistor M1). In this case, the second drive voltage PWM_VH2 supplied by the second drive voltage end PWM_VH2 is transmitted through the second drive transistor M8 and the connection node N to the gate of the first drive transistor M1 and may control the first drive transistor M1 to turn off. Therefore, the pulse width modulation circuit 120 may control the conductive duration of the first drive transistor M1. That is, the pulse width modulation circuit 120 may control the duration of the drive current so that the light-emitting element LD displays the brightness with a corresponding grayscale. In the case where the second drive voltage PWM_VH2 may control the first drive transistor M1 to turn off, when the first drive transistor M1 is a p-type transistor, the second drive voltage PWM_VH2 is at a high level. On the contrary, when the first drive transistor M1 is an n-type transistor, the second drive voltage PWM_VH2 is at a low level.

A first end of the second reset transistor M9 is connected to a second reset voltage end PWM_REF. A second end of the second reset transistor M9 is connected to a gate of the second drive transistor M8 (or the second end of the second reset transistor M9 is connected to the gate of the second drive transistor M8 at a node N1_PWM). A gate of the second reset transistor M9 receives a second reset scan signal PWM_S1. In the control of the second reset scan signal PWM_S1, the second reset transistor M9 is turned on so that a second reset voltage PWM_REF supplied by the second reset voltage end PWM_REF is transmitted to the gate of the second drive transistor M8 to reset the potential of the gate of the second drive transistor M8.

The pulse width data write circuit includes a pulse width data write transistor M10 and a second compensation transistor M11. A first end of the pulse width data write transistor M10 is connected to a pulse width data line PWM_DL. A second end of the pulse width data write transistor M10 is connected to a first end of the second drive transistor M8. A gate of the pulse width data write transistor M10 receives a second data write scan signal W_S2. In the control of the second data write scan signal W_S2, the pulse width data write transistor M10 is turned on so that the pulse width data PWM_DATA supplied by the pulse width data line PWM_DL is transmitted to the first end of the second drive transistor M8. A first end of the second compensation transistor M11 is connected to a second end of the second drive transistor M8. A second end of the second compensation transistor M11 is connected to the gate of the second drive transistor M8. A gate of the second compensation transistor M11 receives a second compensation scan signal W_S3. In the control of the second compensation scan signal W_S3, the second compensation transistor M11 is turned on so that the second end of the second drive transistor M8 communicates with the gate of the second drive transistor M8, enabling the second drive transistor M8 to be connected in a diode manner. The pulse width data write transistor M10 and the second compensation transistor M11 that are in the pulse width data write circuit may be turned on in the control of the same control signal PWM_S2 so that the pulse width data PWM_DATA supplied by the pulse width data line PWM_DL is transmitted to the gate of the second drive transistor M8. The diode connection manner of the second drive transistor M8 may enable a threshold voltage Vth2 of the second drive transistor M8 to be supplied to the gate of the second drive transistor M8 in a self-compensation manner to weaken or eliminate the effect of different second drive transistors M8 in a display panel on display uniformity due to different threshold voltages Vth2.

The second light emission control circuit includes a third light emission control transistor M12 and a fourth light emission control transistor M13. The third light emission control transistor M12 is connected in series between the second drive voltage end PWM_VH2 and the second drive transistor M8. A first end of the third light emission control transistor M12 is connected to the second drive voltage end PWM_VH2. A second end of the third light emission control transistor M12 is connected to the first end of the second drive transistor M8. A gate of the third light emission control transistor M12 receives a third light emission control signal W_EM1. In the control of the third light emission control signal W_EM1, the third light emission control transistor M12 is turned on so that the second drive voltage PWM_VH2 supplied by the second drive voltage end PWM_VH2 is transmitted to the first end of the second drive transistor M8. The fourth light emission control transistor M13 is connected in series between the second drive transistor M8 and the connection node N. A first end of the fourth light emission control transistor M13 is connected to the second end of the second drive transistor M8. A second end of the fourth light emission control transistor M13 is connected to the connection node N (or the second end of the fourth light emission control transistor M13 is the connection node N). As shown in FIG. 2, the connection node N is connected to the gate of the first drive transistor M1 of the current driving circuit 110. That is, the second end of the fourth light emission control transistor M13 may be connected to the gate of the first drive transistor M1. A gate of the fourth light emission control transistor M13 receives a fourth light emission control signal W_EM2. In the control of the fourth light emission control signal W_EM2, the fourth light emission control transistor M13 is turned on so that a path between the second drive transistor M8 and the current driving circuit 110 is conductive. Therefore, as shown in FIG. 2, the path between the second drive transistor M8 and the gate of the first drive transistor M1 is conductive. The third light emission control transistor M12 and the fourth light emission control transistor M13 that are in the second light emission control circuit may be turned on in the control of the same control signal PWM_EM so that a path between the second drive voltage end PWM_VH2 and the current driving circuit 110 is conductive (or a path between the second drive voltage end PWM_VH2 and the connection node N is conductive). Therefore, the second drive voltage PWM_VH2 supplied by the second drive voltage end PWM_VH2 is transmitted to the current driving circuit 110. Illustratively, the second drive voltage PWM_VH2 supplied by the second drive voltage end PWM_VH2 is transmitted to the gate of the first drive transistor M1, controlling the first drive transistor M1 to turn off and thereby controlling the duration of the drive current supplied by the current driving circuit 110.

The second storage capacitor C0 is connected between a sweep signal end SWEEP and the gate of the second drive transistor M8. One plate of the second storage capacitor C0 is connected to the sweep signal end SWEEP at a node N_SWEEP. The other plate of the second storage capacitor C0 is connected to the gate of the second drive transistor M8 at the node N1_PWM. The second storage capacitor is configured to receive the pulse width data PWM_DATA written to the gate of the second drive transistor M8 and maintain the potential of the gate of the second drive transistor M8. A sweeping pulse of the sweep signal SWEEP supplied by the sweep signal end SWEEP may be in the form of a triangular wave. The sweeping pulse may decrease from a high level H_SWEEP to a low level L_SWEEP linearly; or, the sweeping pulse may increase from the low level L_SWEEP to the high level H_SWEEP linearly. When the sweeping pulse of the sweep signal SWEEP is applied to the second storage capacitor C0, the potential on the other plate of the second storage capacitor C0 (the plate connected to the gate of the second drive transistor M8) changes synchronously under the bootstrap action of the capacitor. That is, the change of the sweeping pulse of the sweep signal SWEEP may be reflected at the potential of the gate of the second drive transistor M8 through the second storage capacitor C0, and the potential of the gate of the second drive transistor M8 changes linearly synchronously.

A first end of the sweeping transistor M14 is connected to a sweeping constant voltage end SWEEP_GND. A second end of the sweeping transistor M14 is connected to one plate of the second storage capacitor C0 at the node N_SWEEP. A gate of the sweeping transistor M14 receives a sweeping scan signal W_S4. In the control of the sweeping scan signal W_S4, the sweeping transistor M14 is turned on so that a sweeping constant voltage SWEEP_GND supplied by the sweeping constant voltage end SWEEP_GND is transmitted to the second storage capacitor C0. The sweeping constant voltage SWEEP_GND may be the same as the high level H_SWEEP of the sweep signal SWEEP or may be the same as the low level L_SWEEP of the sweep signal SWEEP. In this case, the sweeping constant voltage end SWEEP_GND and the sweep signal end SWEEP each supply a signal to one plate of the second storage capacitor C0 (the plate connected to the node N_SWEEP), further guaranteeing the stability of the potential of the plate of the second storage capacitor C0 and reducing the signal disturbance caused by a surrounding signal. The sweeping scan signal and the second data write scan signal may use the same scan signal PWM_S2.

Figure 3:
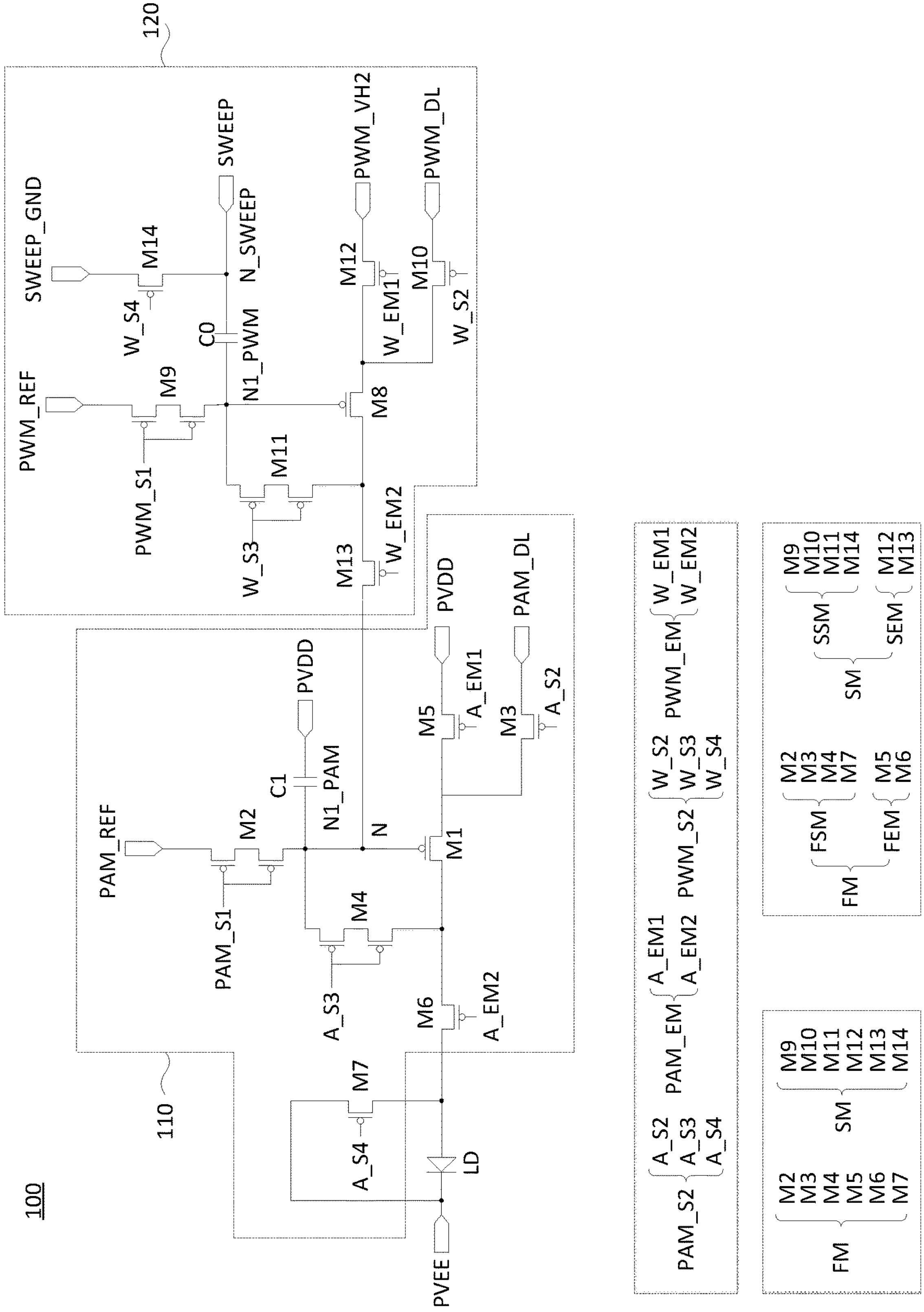

FIG. 3 is a pixel circuit diagram according to an embodiment of the present application. Different from FIG. 2, part of the transistors in FIG. 3 are each a double-gate transistor including two transistors connected in series. Moreover, two transistors in one double-gate transistor receive the same control signal.

The first reset transistor M2 and the first compensation transistor M4 that are in the current driving circuit 110 may be each a double-gate transistor to reduce a leakage current in each of the two transistors, mitigating the effect on the potential of the node N1_PAM.

The second reset transistor M9 and a second compensation transistor M11 that are in the pulse width modulation circuit 120 may be each a double-gate transistor to reduce a leakage current in each of the two transistors, mitigating the effect on the potential of the node N1_PWM.

Figure 4:
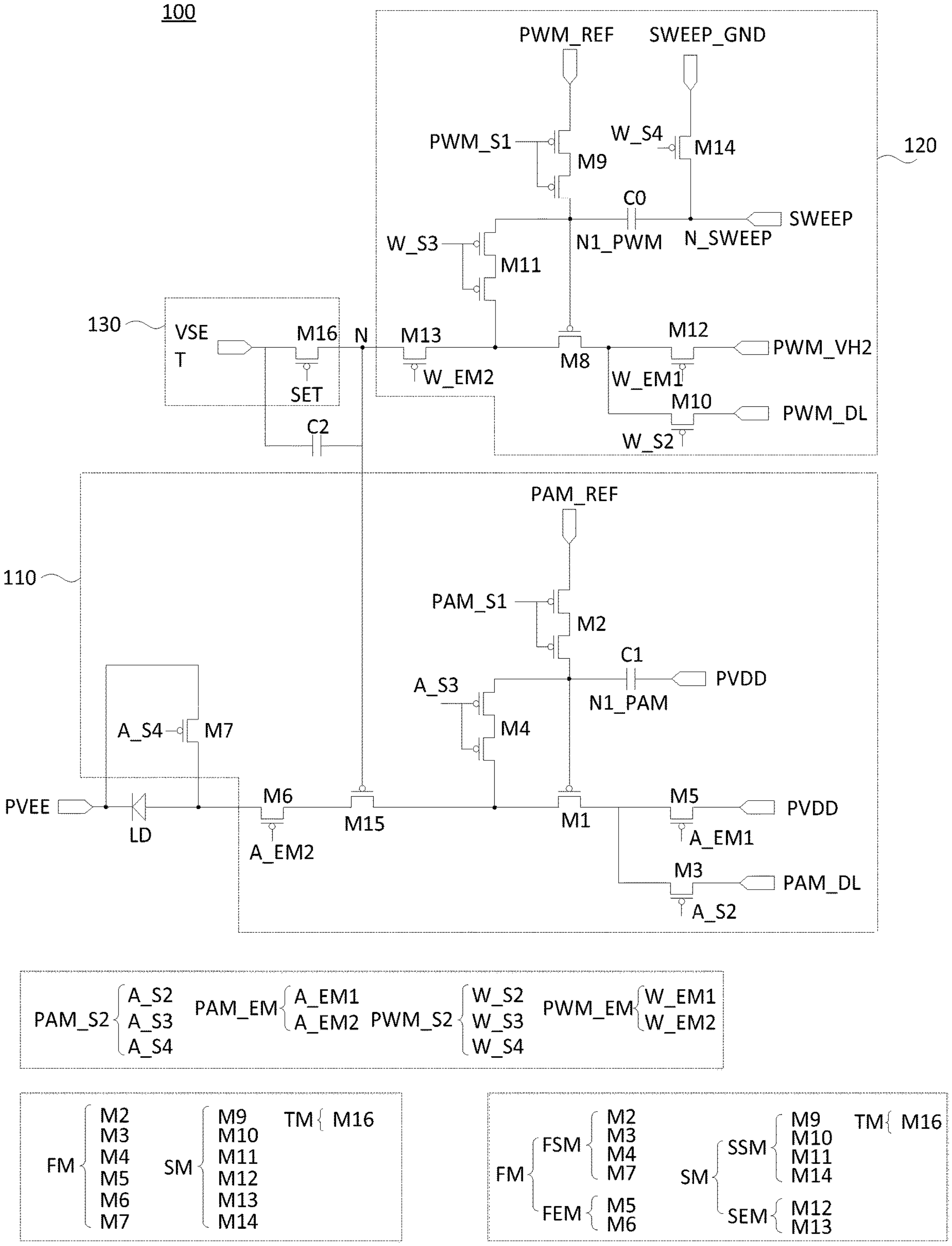

FIG. 4 is a pixel circuit diagram according to an embodiment of the present application.

The pixel circuit 100 includes a current driving circuit 110, a pulse width modulation circuit 120, a reset circuit 130, and a third storage capacitor C2.

The current driving circuit 110 is configured to supply a drive current to a light-emitting element LD to drive the light-emitting element LD to emit light.

The pulse width modulation circuit 120 is configured to control the light emission duration of the light-emitting element LD based on pulse width data PWM_DATA and a sweep signal SWEEP.

The current driving circuit 110 may be electrically connected to the pulse width modulation circuit 120 at a connection node N.

The current driving circuit 110 may include a first drive transistor, a first reset transistor, a drive data write circuit, a first light emission control circuit, a third reset transistor, a first storage capacitor, and a light emission duration control transistor.

The first drive transistor M1 may generate a drive current based on drive data PAM_DATA and a first drive voltage PVDD supplied by a first drive voltage end PVDD to drive the light-emitting element LD to emit light.

The first reset transistor M2 is configured to reset the potential of a gate of the first drive transistor M1.

The drive data write circuit includes a drive data write transistor M3 and a first compensation transistor M4 and is configured to write the drive data PAM_DATA supplied by a drive data line PAM_DL to the gate of the first drive transistor M1.

The first light emission control circuit includes a first light emission control transistor M5 and a second light emission control transistor M6. The first light emission control transistor M5 is connected in series between the first drive voltage end PVDD and the first drive transistor M1. The second light emission control transistor M6 is connected in series between the first drive transistor M1 and the light-emitting element LD. The first light emission control transistor M5 and the second light emission control transistor M6 are turned on in the control of a first light emission control signal A_EM1 and a second light emission control signal A_EM2 (or by using the same light emission control signal PAM_EM).

The third reset transistor M7 is connected between a third reset voltage end PVEE and a first electrode of the light-emitting element LD and is configured to reset the potential of the first electrode of the light-emitting element LD.

The first storage capacitor C1 is connected between the first drive voltage end PVDD and the gate of the first drive transistor M1 (or a node N1_PAM).

The first drive transistor M1, the first light emission control circuit, and the light-emitting element LD are connected in series between the first drive voltage end PVDD and a third drive voltage end PVEE. When the light-emitting element LD emits light, the drive current exists in a path that is between the first drive voltage end PVDD and the third drive voltage end PVEE and is limited by the first drive transistor M1, the first light emission control circuit, and the light-emitting element LD. The path is defined as a current driving path.

FIG. 4 provides another manner of controlling the duration of the drive current apart from the manner of controlling the duration of the drive current (that is, the light emission duration of the light-emitting element LD) by using the first drive transistor M1 located in the current driving path (as shown in FIGS. 2 and 3).

The current driving circuit 110 further includes the light emission duration control transistor M15. The light emission duration control transistor M15 may be located in the current driving path. That is, the light emission duration control transistor M15 may be connected in series between the first drive voltage end PVDD and the third drive voltage end PVEE and in a path limited by the first drive transistor M1, the first light emission control circuit, and the light-emitting element LD so that the light emission duration control transistor M15 is connected to the first drive transistor M1 in series. Therefore, the light emission duration control transistor M15 may control the on and off of the current driving path, thereby controlling the light emission duration of the light-emitting element LD.

As shown in FIG. 4, the light emission duration control transistor M15 is connected between the first drive transistor M1 and the second light emission control transistor M6 and is configured to control the on and off of the current driving path. A first end of the light emission duration control transistor M15 is connected to a second end of the first drive transistor M1. A second end of the light emission duration control transistor M15 is connected to a first end of the second light emission control transistor M6. A gate of the light emission duration control transistor M15 is electrically connected to the connection node N.

In the pixel circuit including the light emission duration control transistor M15, the second light emission control transistor M6 may be connected to the first drive transistor M1 through the light emission duration control transistor M15.

The pulse width modulation circuit 120 is electrically connected to the current driving circuit 110 through the connection node N. In the embodiment where the current driving circuit 110 includes the light emission duration control transistor M15, the pulse width modulation circuit 120 may be electrically connected to the gate of the light emission duration control transistor M15 in the current driving circuit 110. That is, the connection node N is the gate of the light emission duration control transistor M15. The gate of the light emission duration control transistor M15 receives a second drive voltage end PWM_VH2 transmitted by the pulse width modulation circuit 120 to the connection node N. The second drive voltage end PWM_VH2 controls the light emission duration control transistor M15 to turn off. Therefore, the light emission duration control transistor M15 controls the light emission duration of the light-emitting element LD by controlling the duration of the drive current.

The reset circuit 130 is connected between a reset voltage end VSET and the connection N and is configured to reset the potential of the connection node N. Referring to FIG. 4, the reset circuit 130 is connected between the reset voltage end VSET and the gate of the light emission duration control transistor M15 and is configured to reset the potential of the gate of the light emission duration control transistor M15.

The reset circuit 130 includes a reset transistor M16. A first end of the reset transistor M16 is connected to the reset voltage end VSET. A second end of the reset transistor M16 is connected to the gate of the light emission duration control transistor M15 (that is, the connection node N). A gate of the reset transistor M16 receives a reset control signal SET. In the control of the reset control signal SET, the reset transistor M16 is turned on so that a reset voltage VSET of the reset voltage end VSET is transmitted to the gate of the light emission duration control transistor M15.

The third storage capacitor C2 is connected between the reset voltage end VSET and the connection node N and is configured to maintain the potential of the connection node N.

Figure 5:
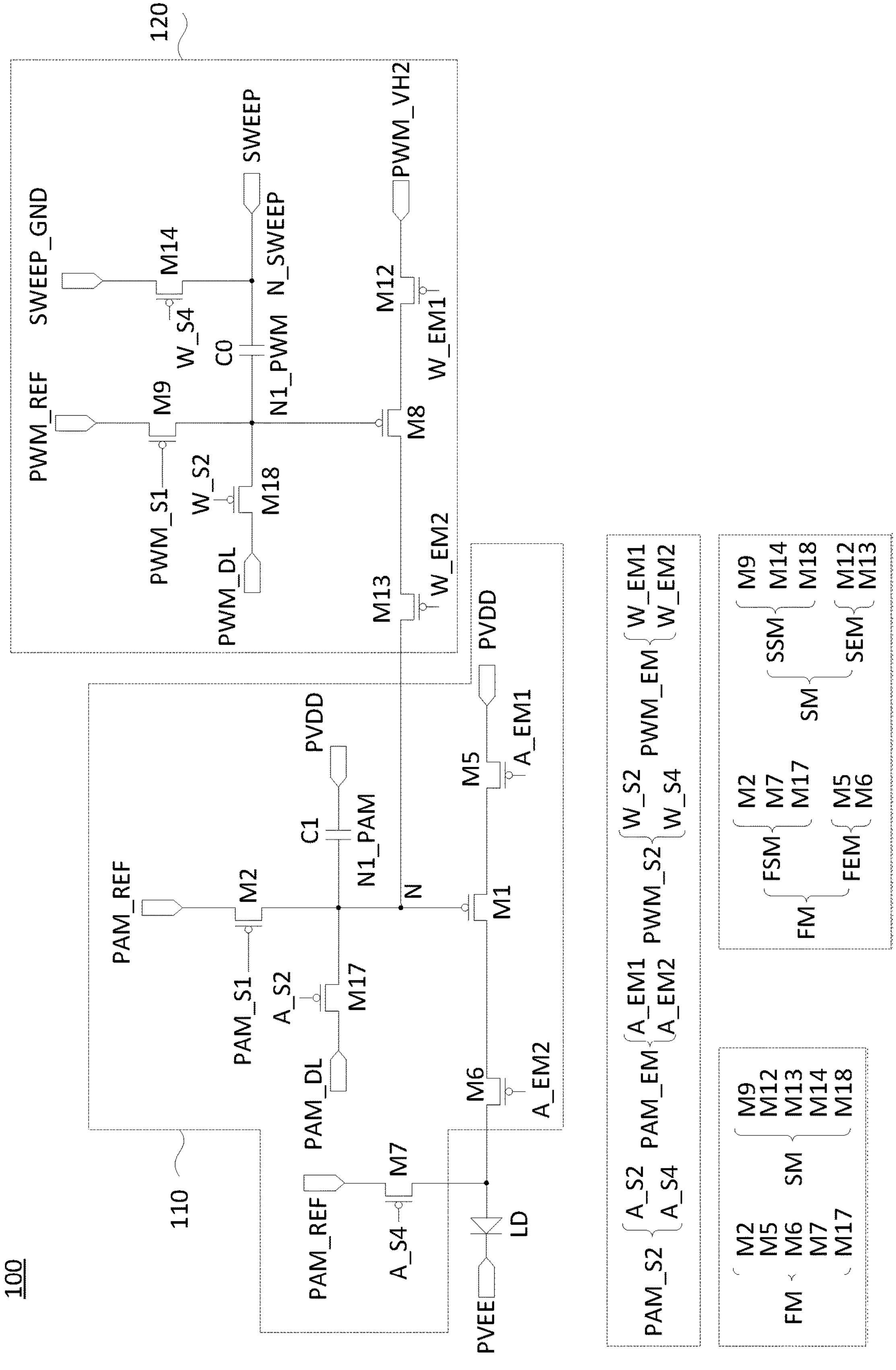

FIG. 5 is a pixel circuit diagram according to an embodiment of the present application. The difference between FIG. 5 and FIG. 2 lies in the arrangement of the drive data write circuit, the pulse width data write circuit, and the third reset transistor.

The drive data write circuit includes a drive data write transistor M17. A first end of the drive data write transistor M17 is connected to the drive data line PAM_DL. A second end of the drive data write transistor M17 is connected to the gate of the first drive transistor M1, and the drive data write transistor M17 is configured to receive the first data write scan signal A_S2.

The pulse width data write circuit includes a pulse width data write transistor M18. A first end of the pulse width data write transistor M18 is connected to the pulse width data line PWM_DL. A second end of the pulse width data write transistor M18 is connected to the gate of the second drive transistor M8, and the pulse width data write transistor M18 is configured to receive the second data write scan signal W_S2.

The first end of the third reset transistor M7 is connected to the third reset voltage end PAM_REF. The third reset voltage end PAM_REF and the first reset voltage end are the same voltage end PAM_REF. The third reset transistor M7 transmits a third reset voltage PAM_REF supplied by the third reset voltage end PAM_REF to the first electrode of the light-emitting element LD.

Figure 6:
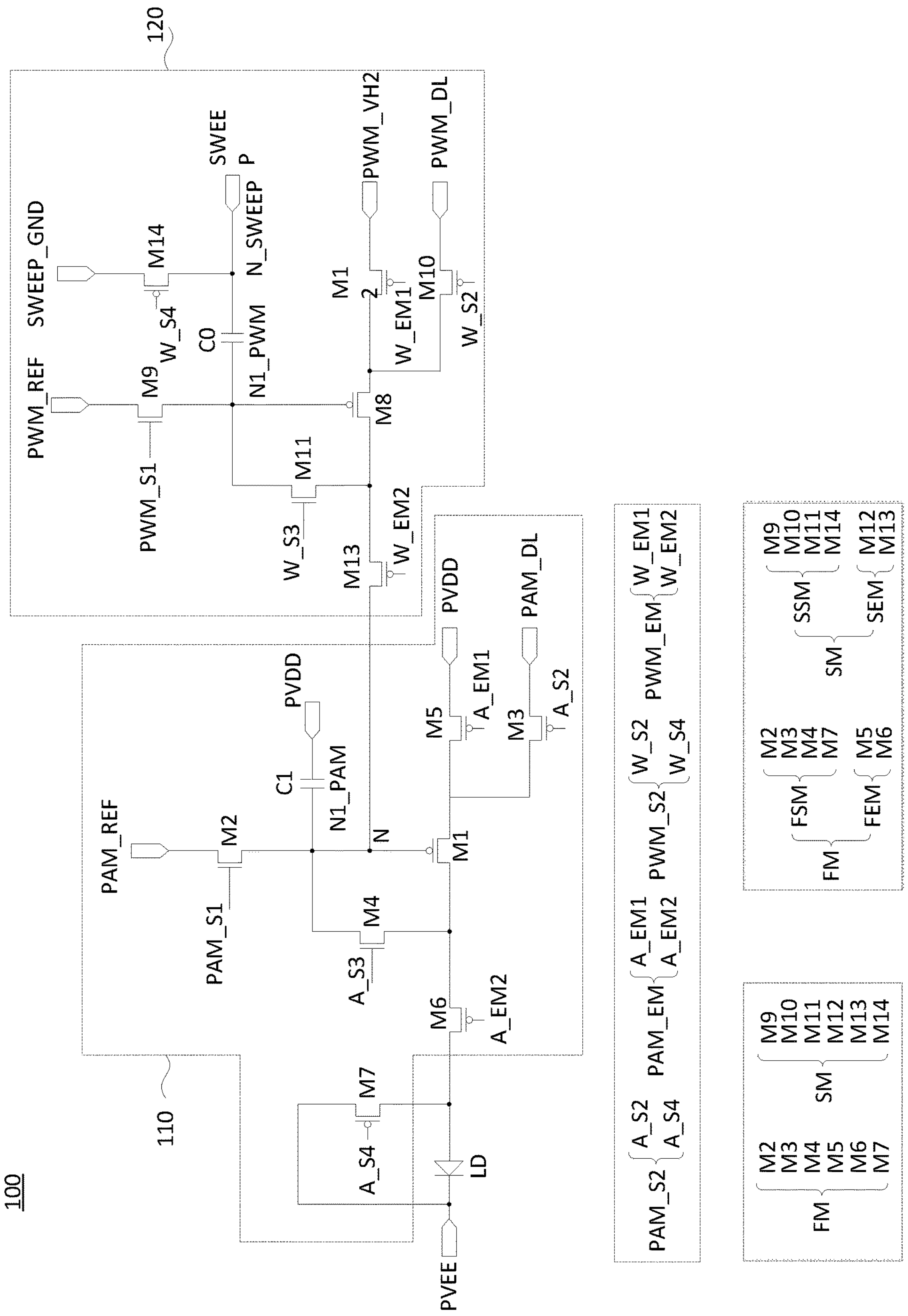

FIG. 6 is a pixel circuit diagram according to an embodiment of the present application. The difference between FIG. 6 and FIG. 2 lies in the arrangement of the first reset transistor, the second reset transistor, the first compensation transistor, and the second compensation transistor.

The first reset transistor M2, the second reset transistor M9, the first compensation transistor M4, and the second compensation transistor M11 may be each an n-type transistor and may be turned on in the control of a high level and turned off in the control of a low level respectively. Other transistors may be each a p-type transistor.

In an embodiment, an active layer of the first reset transistor M2, an active layer of the second reset transistor M9, an active layer of the first compensation transistor M4, and an active layer of the second compensation transistor M11 may use the same material as active layers of other transistors.

In another embodiment, the first reset transistor M2, the second reset transistor M9, the first compensation transistor M4, and the second compensation transistor M11 may be each a metal-oxide transistor. For example, the material of an active layer of such a transistor includes indium gallium zinc oxide (for example, IGZO). Active layers of other transistors may include low-temperature polycrystalline silicon.

Figure 7:
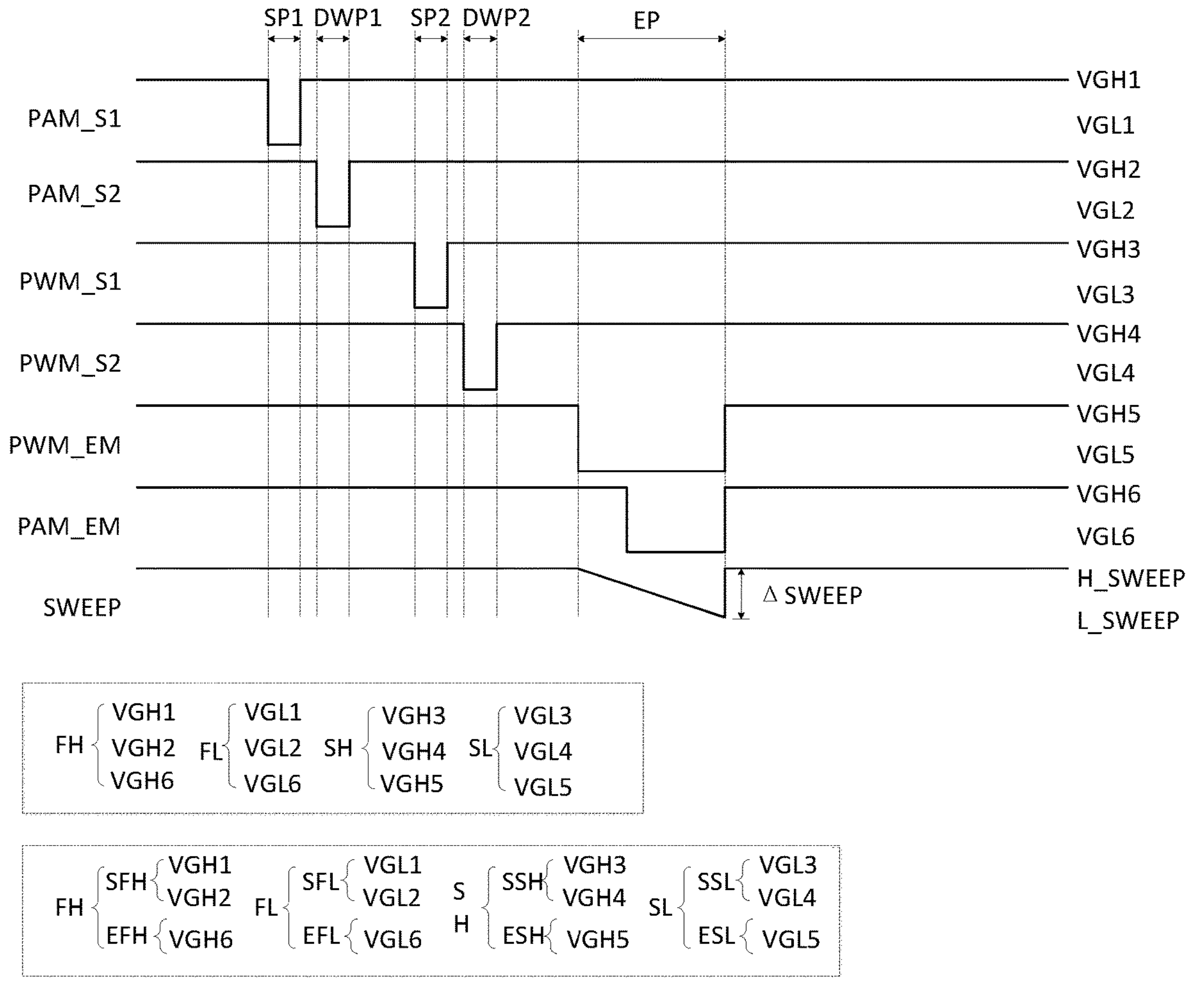
FIGS. 7 to 10 are timing diagrams of control signals of a pixel circuit according to embodiments of the present application.

FIG. 7 is a timing diagram of control signals of a pixel circuit according to an embodiment of the present application. The working process of the pixel circuit is described in combination with FIGS. 2, 3, 5, and 7. The control signal timing in FIG. 7 may also be applied to pixel circuits in other drawings in the present application.

The working process of the pixel circuit 100 includes a first reset phase SP1, a first data write phase DWP1, a second reset phase SP2, a second data write phase DWP2, and a light emission phase EP.

High levels and low levels of the control signals are as below.

A PAM_S1: a VGH1/a VGL1.

A PAM_S2: a VGH2/a VGL2.

A PWM_S1: a VGH3/a VGL3.

A PWM_S2: a VGH4/a VGL4.

A PWM_EM: a VGH5/a VGL5.

A PAM_EM: a VGH6/a VGL6.

At the first reset phase SP1, the first reset scan signal PAM_S1 controls the first reset transistor M2 to turn on. The first reset voltage PAM_REF supplied by the first reset voltage end PAM_REF is transmitted through the first reset transistor M2 to the gate of the first drive transistor M1 (the same as the node N1_PAM). The potential of the node N1_PAM is PAM_REF.

At the first data write phase DWP1, the scan signal PAM_S2 controls the drive data write circuit to turn on. The drive data PAM_DATA supplied by the drive data line PAM_DL is written to the gate of the first drive transistor M1. As shown in FIGS. 2 and 3, the drive data write transistor M3 and the first compensation transistor M4 are turned on. The potential of the node N1_PAM further includes the threshold voltage Vth1 of the self-compensating first drive transistor M1. The potential of the node N1_PAM is PAM_DATA+Vth1. Alternatively, as shown in FIG. 5, the drive data write transistor M17 is turned on. The potential of the node N1_PAM is PAM_DATA.

At the second reset phase SP2, the second reset scan signal PWM_S1 controls the second reset transistor M9 to turn on. The second reset voltage PWM_REF supplied by the second reset voltage end PWM_REF is transmitted through the second reset transistor M9 to the gate of the second drive transistor M8 (the same as the node N1_PWM). The potential of the node N1_PWM is PWM_REF. The reset voltage PWM_REF may be less than the minimum voltage value of the pulse width data PWM_DATA.

At the second data write phase DWP2, the scan signal PWM_S2 controls the pulse width data write circuit to turn on. The pulse width data PWM_DATA supplied by the pulse width data line PWM_DL is written to the gate of the second drive transistor M8. As shown in FIGS. 2 and 3, the pulse width data write transistor M10 and the second compensation transistor M11 are turned on. The potential of the node N1_PWM further includes the threshold voltage Vth2 of the self-compensating second drive transistor M8. The potential of the node N1_PWM is PWM_DATA+Vth2. Alternatively, as shown in FIG. 5, the pulse width data write transistor M18 is turned on. The potential of the node N1_PWM is PWM_DATA.

At the light emission phase EP, the light emission control signal PAM_EM controls the first light emission control transistor M5 and the second light emission control transistor M6 to turn on. The light emission control signal PWM_EM controls the third light emission control transistor M12 and the fourth light emission control transistor M13 to turn on. The voltage value of the sweep signal SWEEP supplied by the sweep signal end SWEEP changes linearly and is reflected to the node N1_PWM under the bootstrap action of the second storage capacitor C0 so that the potential of the node N1_PWM changes synchronously. As shown in FIG. 7, the sweep signal SWEEP reduces linearly from the high level H_SWEEP to the low level L_SWEEP. In this case, the potential of the node N1_PWM reduces linearly from PWM_DATA+Vth2 to PWM_DATA+Vth2−ΔSWEEP (as shown in FIGS. 2 and 3). Alternatively, the potential of the node N1_PWM reduces linearly from PWM_DATA to PWM_DATA−ΔSWEEP (as shown in FIG. 5). ΔSWEEP denotes a voltage difference between the high level H_SWEEP of the sweep signal SWEEP and the low level L_SWEEP of the sweep signal SWEEP. In the linear reduction process of the sweep signal SWEEP, the potential of the node N1_PWM reduces synchronously. When a voltage difference between the gate of the second drive transistor M8 and a source of the second drive transistor M8 (the first end of the second drive transistor M8) is Vth2, the second drive transistor M8 is in a critical state of switching between the on state and the off state. That is, when the potential of the node N1_PWM decreases to PWM_VH2+Vth2, the second drive transistor M8 reaches the critical state. As the potential of the node N1_PWM continues to decrease, the second drive transistor M8 is turned on so that the second drive voltage PWM_VH2 of the second drive voltage end PWM_VH2 is transmitted to the gate of the first drive transistor M1. Accordingly, the first drive transistor M1 is turned off and no longer supplies the drive current to the light-emitting element LD to drive the light-emitting element LD to emit light. In this case, the potential of the node N1_PWM is PWM_VH2.

At the light emission phase EP, when the second drive transistor M8 is in the off state, the voltage supplied by the second drive voltage end PWM_VH2 is not transmitted to the gate of the first drive transistor M1. The potential of the gate of the first drive transistor M1 is kept as the drive data PAM_DATA. In this case, the first drive transistor M1 generates the drive current based on the drive data PAM_DATA and the first drive voltage PVDD supplied by the first drive voltage end PVDD so that the light-emitting element LD emits light. When the potential of the gate of the second drive transistor M8 changes to be equal to or less than the potential of the source (that is, the second drive voltage PWM_VH2), the second drive transistor M8 is turned on and transmits a signal supplied by the second drive voltage end PWM_VH2 to the gate of the first drive transistor M1 so that the first drive transistor M1 is turned off. In this case, the first drive transistor M1 stops driving the light-emitting element LD to emit light. Before the first drive transistor M1 does not receive the second drive voltage PWM_VH2, the first drive transistor M1 may generate the drive current based on the drive data PAM_DATA and the first drive voltage PVDD supplied by the first drive voltage end PVDD to drive the light-emitting element LD to emit light, thus, in a dark state, it is possible that the pulse width modulation circuit 120 delays the supply of the second drive voltage PWM_VH2 to the gate of the first drive transistor M1 of the current driving circuit 110, resulting in the case where the first drive transistor M1 drives the light-emitting element LD to emit light abnormally. As shown in FIG. 7, a moment when the second light emission control signal PWM_EM hops from a non-enable level to an enable level (a falling edge of the PWM_EM) is set to be earlier than a moment when the first light emission control signal PAM_EM hops from a non-enable level to an enable level (a falling edge of the PAM_EM) so as to reduce the possibility that the pulse width modulation circuit 120 delays the supply of an off voltage to the current driving circuit 110, thereby avoiding the phenomenon that the light-emitting element emits undesired light in the dark state.

Referring to the signal timing diagram shown in FIG. 7, in the working process of the pixel circuit 100, a potential changing range [L1, H1] of the node N1_PWM is [min (PWM_REF, MIN_DATA+Vth2−ΔSWEEP), MAX_DATA+Vth2] or [min (PWM_REF, MIN_DATA−ΔSWEEP), MAX_DATA]. L1 and H1 denote the minimum value and the maximum value respectively. The expression of L1 is min (PWM_REF, MIN_DATA+Vth2−ΔSWEEP) or (PWM_REF, MIN_DATA−ΔSWEEP), indicating that the smaller of the two is taken. PWM_REF denotes the second reset voltage. MIN_DATA denotes the minimum voltage value in the pulse width data supplied to the pulse width modulation circuit 120. MAX_DATA denotes the maximum voltage value in the pulse width data supplied to the pulse width modulation circuit 120. Vth2 denotes the threshold voltage of the second drive transistor M8. The sweep signal voltage difference ΔSWEEP is the voltage difference between the high level H_SWEEP of the sweep signal SWEEP and the low level L_SWEEP of the sweep signal SWEEP.

Referring to the signal timing diagram shown in FIG. 7, in the working process of the pixel circuit 100, a potential changing range [L2, H2] of the node N1_PAM is [PAM_REF, PWM_VH2]. L2 and H2 denote the minimum value and the maximum value respectively. PAM_REF denotes the first reset voltage. PWM_VH2 denotes the second drive voltage.

It can be seen that the potential changing range [L1, H1] of the node N1_PWM is different from the potential changing range [L2, H2] of the node N1_PAM.

Figure 8:
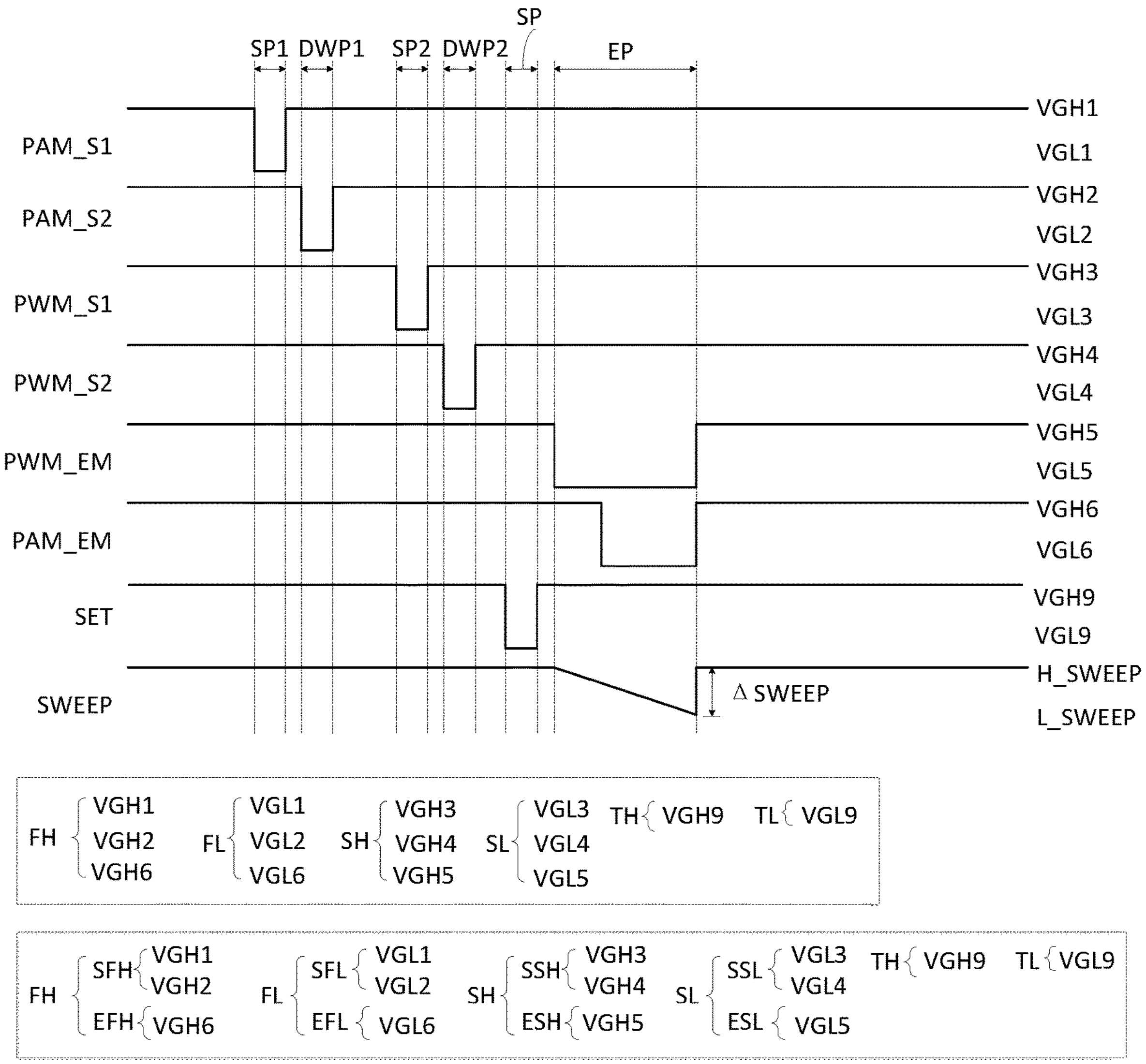

FIG. 8 is a timing diagram of control signals of a pixel circuit according to an embodiment of the present application. The difference between FIG. 8 and FIG. 7 lies in that the FIG. 8 includes the timing of a reset signal and a reset phase. The description is made in combination with FIGS. 4 and 8.

The working process of the pixel circuit 100 further includes the reset phase SP. The reset phase SP is located before the light emission phase EP and may be located after the second data write phase DWP2.

A high level of the reset signal SET and a low level of the reset signal SET are VGH9 and VGL9 respectively.

At the reset phase SP, the reset control signal SET controls the reset transistor M16 to turn on and supplies the reset voltage VSET to the gate of the light emission duration control transistor M15.

Referring to the signal time diagram shown in FIG. 8, in the working process of the pixel circuit 100, a potential changing range [L3, H3] of the node N is [VSET, PWM_VH2]. For the potential changing range [L1, H1] of the node N1_PWM, reference may be made to the description about FIG. 7.

It can be seen that the potential changing range [L1, H1] of the node N1_PWM is different from the potential changing range [L3, H3] of the node N.

Figure 9:
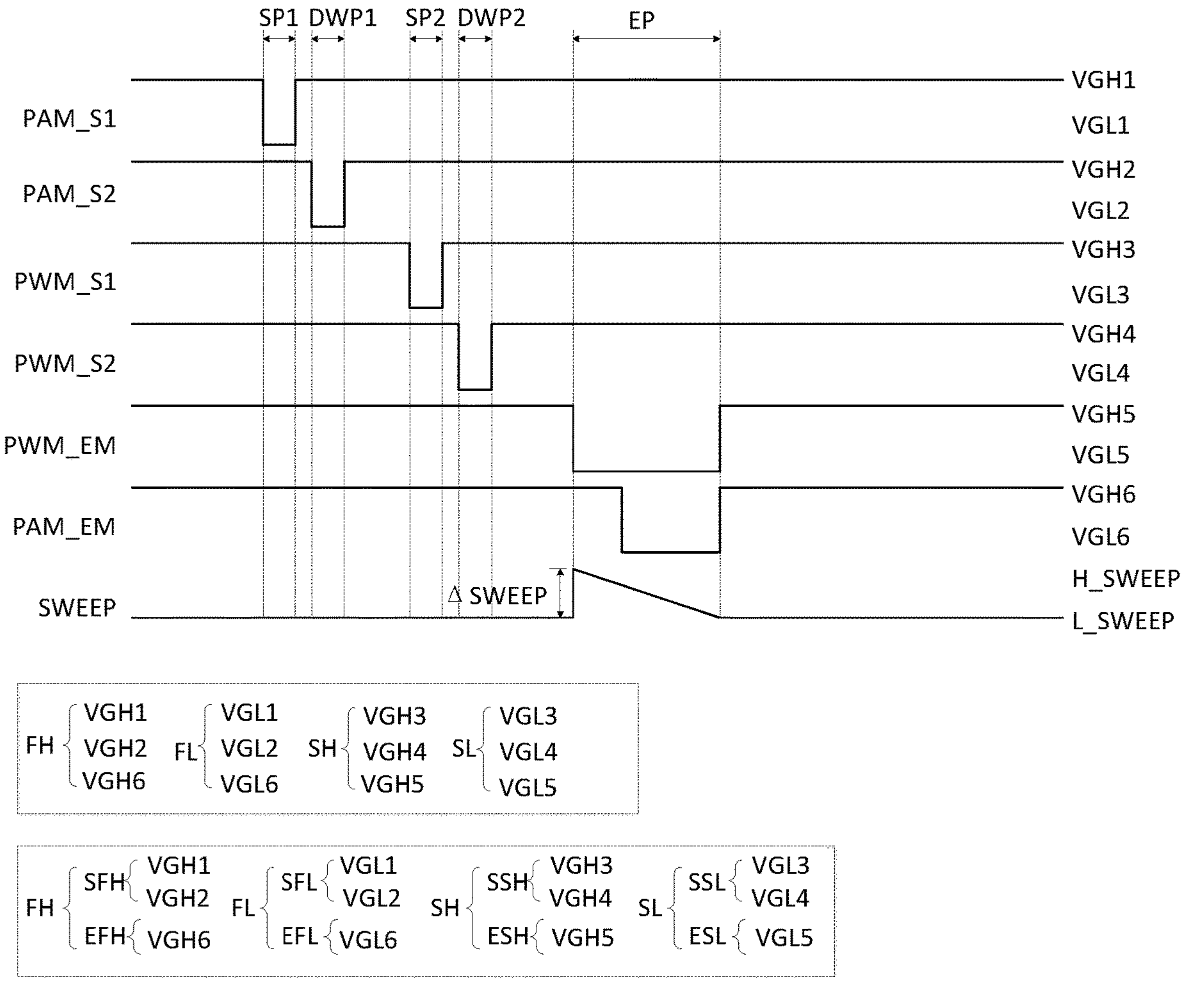

FIG. 9 is a timing diagram of control signals of a pixel circuit according to an embodiment of the present application. The difference from FIG. 7 lies in the arrangement of the sweep signal SWEEP. The potential change of the node N1_PWM is described in combination with FIGS. 2, 3, 5, and 9. Apart from the difference caused by the sweep signal SWEEP, for the description about other signals in FIG. 9, reference may be made to FIG. 7 and the description about FIG. 7.

As shown in FIG. 9, after the second data write phase DWP2, the sweep signal SWEEP hops from the low level L_SWEEP to the high level H_SWEEP and then decreases linearly to the low level L_SWEEP.

At the second data write phase DWP2, the pulse width data PWM_DATA is written to the gate of the second drive transistor M8. The potential of the node N1_PWM is PWM_DATA+Vth2 (referring to FIGS. 2 and 3) or PWM_DATA (referring to FIG. 5).

As the sweep signal SWEEP hops from the low level L_SWEEP to the high level H_SWEEP, the second storage capacitor C0 reflects the potential change to the node N1_PWM. The potential of the node N1_PWM hops by ΔSWEEP to become PWM_DATA+Vth2+ΔSWEEP (or PWM_DATA+ΔSWEEP). The sweep signal voltage difference ΔSWEEP is the voltage difference between the high level H_SWEEP of the sweep signal SWEEP and the low level L_SWEEP of the sweep signal SWEEP.

At the light emission phase EP, the sweep signal SWEEP decreases linearly from the high level H_SWEEP to the low level L_SWEEP. The second storage capacitor C0 reflects the potential change to the node N1_PWM. In this case, the potential of the node N1_PWM decreases linearly from PWM_DATA+Vth2+ΔSWEEP to PWM_DATA+Vth2 or decreases linearly from PWM_DATA+ΔSWEEP to PWM_DATA.

When the sweep signal SWEEP in FIG. 9 is adopted as a sweep signal, in the working process of the pixel circuit 100, the potential changing range [L1, H1] of the node N1_PWM is [PWM_REF, MAX_DATA+Vth2+ΔSWEEP] (referring to FIGS. 2 and 3) or [PWM_REF, MAX_DATA+ΔSWEEP] (referring to FIG. 5), and the potential changing range [L2, H2] of the node N1_PAM is [PAM_REF, PWM_VH2]. It can be seen that the potential changing range [L1, H1] of the node N1_PWM is different from the potential changing range [L2, H2] of the node N1_PAM.

Figure 10:
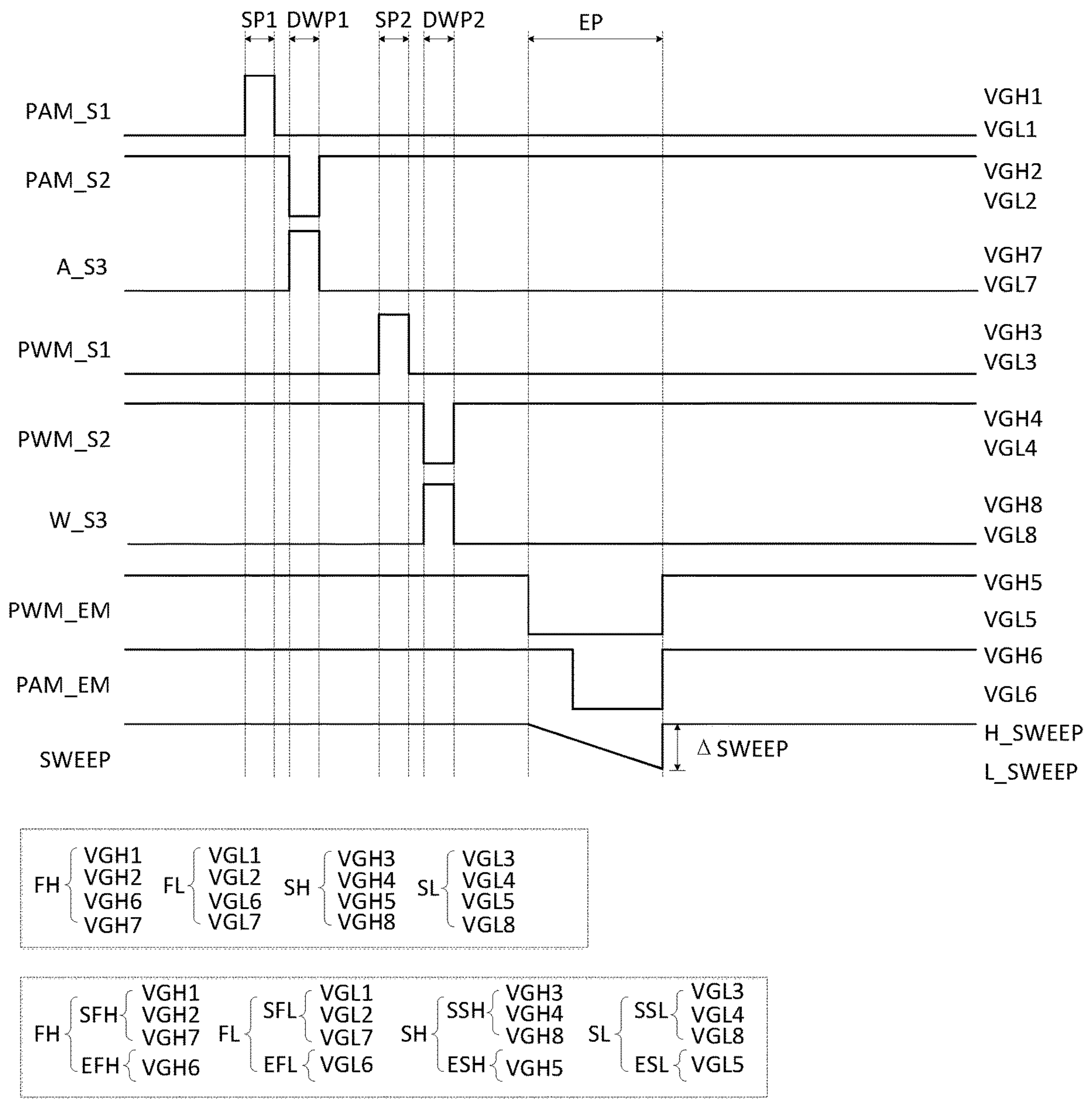

FIG. 10 is a timing diagram of control signals of a pixel circuit according to an embodiment of the present application. The difference between FIG. 10 and FIG. 7 lies in the addition of the first compensation scan signal and the second compensation scan signal. The description is made in combination with FIGS. 6 and 10.

A high level of the first compensation scan signal A_S3 and a low level of the first compensation scan signal A_S3 are a VGH7 and a VGL7 respectively.

A high level of the second compensation scan signal W_S3 and a low level of the second compensation scan signal W_S3 are a VGH8 and a VGL8 respectively.

An enable level of the first compensation scan signal A_S3 is a high level. Moreover, the enable level is located in the first data write phase DWP1 and controls the first compensation transistor M4 to turn on.

An enable level of the second compensation scan signal W_S3 is a high level. Moreover, the enable level is located in the second data write phase DWP2 and controls the second compensation transistor M11 to turn on.

In order to make the pixel circuit including the current driving circuit and the pulse width modulation circuit work normally, a high level of a control signal of a gate of each transistor in the pixel circuit and a low level of the control signal need to cover a voltage value possibly existing at a source of the transistor and a voltage value possibly existing at a drain of the transistor, otherwise the transistor may be in the abnormal on state or abnormal off state. For example, for a p-type transistor, a high level of a control signal received by a gate of the transistor may be greater than the voltage of a source of the transistor and the voltage of a drain of the transistor to control the transistor to turn off normally, and a low level of the control signal received by the gate of the transistor may be less than the voltage of the source of the transistor and the voltage of the drain of the transistor to control the transistor to turn on normally. On the contrary, for an n-type transistor, a high level of a control signal received by a gate of the transistor may be greater than the voltage of a source of the transistor and the voltage of a drain of the transistor to control the transistor to turn on normally, and a low level of the control signal received by the gate of the transistor may be less than the voltage of the source of the transistor and the voltage of the drain of the transistor to control the transistor to turn off normally.

In the case where the potential changing range [L1, H1] of the node N1_PWM of the pulse width modulation circuit 120 of the pixel circuit 100 is different from the potential changing range [L2, H2] of the node N1_PAM of the current driving circuit 110 or the potential changing range [L3, H3] of the connection node N, a range [L0, H0] that needs to be covered by a low level and a high level of a control signal of a gate of each transistor in the pixel circuit is [min (L1, L2), max (H1, H2)] or [min (L1, L3), max (H1, H3)] so as to guarantee the normal operation of each transistor in the pixel circuit. That is, L0 is the smaller value in L1 and L2 (or L1 and L3), and H0 is the greater value in H1 and H2 (or H1 and H3). A voltage difference related to the range [L0, H0] is greater than a voltage difference related to the range [L1, H1] and a voltage difference related to the range [L2, H2] or [L3, H3]. A voltage difference between a high level of a control signal of a gate of each transistor in the pixel circuit and a low level of the control signal of the gate of each transistor in the pixel circuit (that is, the voltage difference between the high level and the low level) is relatively great, resulting in a poor stability of circuit operation and significantly increasing the risk of a display failure.

In view of the problem of a relatively great voltage difference of a control signal of a gate of each transistor in the pixel circuit, in the pixel circuit 100, a high level of a control signal of a gate of a transistor in the pulse width modulation circuit 120 and a low level of the control signal are set according to the range [L1, H1], and a high level of a control signal of a gate of a transistor in the current driving circuit 110 and a low level of the control signal are set according to the range [L2, H2] or [L3, H3], thereby reducing a voltage difference of each control signal. Illustratively, the high level of the control signal of the gate of the transistor in the pulse width modulation circuit 120 may be set to be greater than the high level of the control signal of the gate of the transistor in the current driving circuit 110; and/or, the low level of the control signal of the gate of the transistor in the pulse width modulation circuit 120 may be set to be greater than the low level of the control signal of the gate of the transistor in the current driving circuit 110.

The current driving circuit 110 in the pixel circuit 100 includes the first-type switch transistor FM. A gate of the first-type switch transistor FM receives a first-type control signal FC. The first-type control signal FC includes a first high level FH and a first low level FL. The pulse width modulation circuit 120 includes the second-type switch transistor SM. A gate of the second-type switch transistor SM receives a second-type control signal SC. The second-type control signal SC includes a second high level SH and a second low level SL. The second high level SH is greater than the first high level FH; and/or, the second low level SL is greater than the first low level FL.

A control signal may refer to a signal that hops between different levels. A relatively high level is referred to as a high level. A relatively low level is referred to as a low level.

Referring to FIGS. 7 to 10, in the first-type control signal FC, the first high level FH may include one or more of the VGH1, the VGH2, the VGH6, or the VGH7; and the first low level FL may include one or more of the VGL1, the VGL2, the VGL6, or the VGL7. In the second-type control signal SC, the second high level SH may include one or more of the VGH3, the VGH4, the VGH5, or the VGH8; and the second low level SL may include one or more of the VGL3, a VGL4, the VGL5, or the VGL8.

The voltage relationship between the first-type control signal FC and the second-type control signal SC may include one or more of the three cases below.

In case 1, SH>FH, and SL>FL.

In case 2, SH>FH, and SL=FL.

In case 3, SH=FH, and SL>FL.

Control signals of transistors in the pixel circuit 100 include the first-type control signal FC and the second-type control signal SC. The second high level SH of the second-type control signal SC is greater than the first high level FH of the first-type control signal FC; and/or, the second low level SL of the second-type control signal SC is greater than the first low level FL of the first-type control signal FC. Accordingly, a high level of each control signal of at least part of the transistors of the current driving circuit 110 is reduced, reducing a voltage difference of a control signal of a transistor of the current driving circuit 110; or, a low level of each control signal of at least part of the transistors of the pulse width modulation circuit 120 is improved, thereby reducing a voltage difference of a control signal of a transistor of the pulse width modulation circuit 120, improving the stability of circuit operation, and reducing the risk of a display failure.

A voltage difference of the first-type control signal FC and a voltage difference of the second-type control signal SC may have the relationship below.

$$\Delta V10 \leq \Delta V20.$$

A first-type voltage difference ΔV10 is a voltage difference between the first high level FH of the first-type control signal FC and the first low level FL of the first-type control signal FC. A second-type voltage difference ΔV20 is a voltage difference between the second high level SH of the second-type control signal SC and the second low level SL of the second-type control signal SC.

In the case where ΔV10=ΔV20, the voltage difference of the first-type control signal FC may be consistent with the voltage difference of the second-type control signal SC, improving the consistency of the working performance of each transistor.

In order that the drive current is generated between the first drive voltage end PVDD and the third drive voltage end PVEE in the pixel circuit, it may be set that PVDD>PVEE. Additionally, it may be set that PWM_VH2≥PVDD so that the second drive voltage PWM_VH2 controls the first drive transistor M1 (or the light emission duration control transistor M15) to turn off. In these three signals, PVEE is relatively low. Transistors in the current driving circuit 110 are greatly affected by the PVEE. A low level of a control signal received by a transistor is generally set to be relatively low so that the transistor in the current driving circuit 110 is turned on and off normally.

Because the second drive voltage PWM_VH2 is configured to turn off the first drive transistor M1 (as shown in FIGS. 2 and 3) or turn off the light emission duration control transistor M15 (as shown in FIG. 4), the second drive voltage PWM_VH2 needs to be greater than or equal to the voltage of a source of the first drive transistor M1 (or the light emission duration control transistor M15) or the voltage of a drain of the first drive transistor M1 (or the light emission duration control transistor M15), for example, the first drive voltage PVDD. Therefore, it is set that PWM_VH2≥PVDD, guaranteeing that the first drive transistor M1 or the light emission duration control transistor M15 is smoothly turned off under the control of the second drive voltage PWM_VH2 and stops supplying the drive current to the light-emitting element LD. For the second drive transistor M8, the voltage of a source of the second drive transistor M8 or the voltage of a drain of the second drive transistor M8 is PWM_VH2. To make the second drive transistor M8 being turned off, the potential of the gate of the second drive transistor M8 (that is, the node N1_PWM) needs to be greater than or equal to the voltage PWM_VH2. That is, a control signal received by a transistor of the pulse width modulation circuit 120 has a higher high level.

The arrangement in which SH>FH and/or in which SL>FL may reduce the first-type voltage difference ΔV10 or the second-type voltage difference ΔV20.

The current driving circuit 110 includes the first drive transistor M1, the first reset transistor M2, the drive data write circuit, and the first light emission control circuit. The first-type switch transistor FM includes at least one of following transistors: the first reset transistor M2, at least one transistor in the drive data write circuit, or at least one transistor in the first light emission control circuit. The current driving circuit may include the drive data write transistor M3 and the first compensation transistor M4 or the drive data write transistor M17. The first light emission control circuit may include the first light emission control transistor M5 and the second light emission control transistor M6.

Control signals supplied by the same driver circuit may have the same low level and the same high level. The first-type control signal FC may include the first reset scan signal PAM_S1, the first data write scan signal A_S2, and the first compensation scan signal A_S3 (or the scan signal PAM_S2). The PAM_S1 and the PAM_S2 may be supplied by the same driver circuit.

The first-type control signal FC may include the light emission control signal PAM_EM (or the first light emission control signal A_EM1 and the second light emission control signal A_EM2).

Control signals of various transistors included in the first-type switch transistor FM may have the same low level and the same high level. This is not limited in the present application. Control signals of various transistors included in the first-type switch transistor FM may have different low levels and different high levels.

The current driving circuit 110 further includes the third reset transistor M7. The first-type switch transistor FM further includes the third reset transistor M7. The third reset transistor M7 may receive the third reset scan signal A_S4. The first-type control signal FC may include the third reset scan signal A_S4.

The first-type switch transistor FM may include the first-type scan transistor FSM and the first-type light emission control transistor FEM. First-type control signals FC received by these two transistors may have different voltage values.

The first-type scan transistor FSM includes at least one of the following transistors: the first reset transistor M2 or at least one transistor in the drive data write circuit. For example, the first-type scan transistor FSM includes the first reset transistor M2. Moreover/alternatively, the first-type scan transistor FSM includes the drive data write transistor M3/M17. Moreover/alternatively, the first-type scan transistor FSM includes the first compensation transistor M4.

The first-type light emission control transistor FEM includes at least one transistor in the first light emission control circuit. For example, the first-type light emission control transistor FEM includes the first light emission control transistor M5, and/or, the first-type light emission control transistor FEM includes the second light emission control transistor M6.

A first low level SFL received by the first-type scan transistor FSM is greater than a first low level EFL received by the first-type light emission control transistor FEM, and/or, a first high level SFH received by the first-type scan transistor FSM is greater than a first high level EFH received by the first-type light emission control transistor FEM. With this arrangement, the first low level FL received by the first-type scan transistor FSM may be improved to reduce a voltage difference between the first high level FH of a first-type control signal FC received by the first-type scan transistor FSM and the first low level FL of the first-type control signal FC received by the first-type scan transistor FSM, or, the first high level FH received by the first-type light emission control transistor FEM may be reduced to reduce a voltage difference between the first high level FH of a first-type control signal FC received by the first-type light emission control transistor FEM and the first low level FL of the first-type control signal FC received by the first-type light emission control transistor FEM. Accordingly, the stability of circuit operation is further improved, and the risk of a display failure is reduced.

Referring to FIGS. 7 to 10, in the first-type control signals FC, the first high level SFH may include one or more of the VGH1, the VGH2, or the VGH7; the first high level EFH may include the VGH6; the first low level SFL may include one or more of the VGL1, the VGL2, or the VGL7; and the first low level EFL may include the VGL6.

The voltage relationship between the first-type control signal FC received by the first-type scan transistor FSM and the first-type control signal FC received by the first-type light emission control transistor FEM may include one or more of the three cases below.

In case 1, SFL>EFL, and SFH>EFH.

In case 2, SFL>EFL, and SFH=EFH.

In case 3, SFL=EFL, and SFH>EFH.

For the case where the first-type light emission control transistor FEM includes the second light emission control transistor M6, the second light emission control transistor M6 is connected to the third drive voltage end PVEE through the light-emitting element LD. Moreover, the voltage of the third drive voltage end PVEE is less than the voltage of the first drive voltage end PVDD. The control signal received by the second light emission control transistor M6 has a lower low level so that the second light emission control transistor M6 is turned on smoothly. It is set that SFL>EFL so that a voltage difference of the first-type control signal FC received by the first-type scan transistor FSM is reduced on the basis that the first-type light emission control transistor FEM receives the lower first low level EFL.

The voltage difference of the first-type control signal FC received by the first-type scan transistor FSM and a voltage difference of the first-type control signal FC received by the first-type light emission control transistor FEM may satisfy the relationship below.

$$\Delta V1 \leq \Delta V2.$$

A first voltage difference ΔV1 is a voltage difference between the first high level SFH of the first-type scan transistor FSM and the first low level SFL of the first-type scan transistor FSM. A second voltage difference ΔV2 is a voltage difference between the first high level EFH of the first-type light emission control transistor FEM and the first low level EFL of the first-type light emission control transistor FEM.

For case 1, under the premise that SFL>EFL, the arrangement in which SFH>EFH enables voltage differences to be consistent. That is, ΔV1=ΔV2.

For case 2, under the premise that SFL>EFL, the arrangement in which SFH=EFH reduces the number of different level values to be supplied to the driver circuit, helping reduce the complexity of circuit design.

The pulse width modulation circuit 120 includes the second drive transistor M8, the second reset transistor M9, the pulse width data write circuit, and the second light emission control circuit. The second-type switch transistor SM includes at least one of the following transistors: the second reset transistor M9, at least one transistor in the pulse width data write circuit, or at least one transistor in the second light emission control circuit. The pulse width data write circuit may include the pulse width data write transistor M10 and the second compensation transistor M11 or the pulse width data write transistor M18. The second light emission control circuit may include the third light emission control transistor M12 and the fourth light emission control transistor M13.

The second-type control signal SC may include the second reset scan signal PWM_S1, the second data write scan signal W_S2, and the second compensation scan signal W_S3 (or the scan signal PWM_S2). The PWM_S1 and the PWM_S2 may be supplied by the same driver circuit.

The second-type control signal SC may include the light emission control signal PWM_EM (or the second-type control signal SC may include the third light emission control signal W_EM1 and the fourth light emission control signal W_EM2).

Control signals of various transistors included in the second-type switch transistor SM may have the same low level and the same high level. This is not limited in the present application. Control signals of various transistors included in the second-type switch transistor SM may have different low levels and different high levels.

The pulse width modulation circuit 120 further includes the sweeping transistor M14. The second-type switch transistor SM further includes the sweeping transistor M14. The sweeping transistor M14 may receive the sweeping scan signal W_S4. The second-type control signal SC may include the sweeping scan signal W_S4.

The second-type switch transistor SM may include the second-type scan transistor SSM and the second-type light emission control transistor SEM. Second-type control signals SC received by these two transistors may have different voltage values.

The second-type scan transistor SSM includes at least one of the following transistors: the second reset transistor M9 or at least one transistor in the pulse width data write circuit. For example, the second-type scan transistor SSM includes the second reset transistor M9, and/or, the second-type scan transistor SSM includes the pulse width data write transistor M10/M18, and/or, the second-type scan transistor SSM includes the second compensation transistor M11.

The second-type light emission control transistor SEM includes at least one transistor in the second light emission control circuit. For example, the second-type light emission control transistor SEM includes the third light emission control transistor M12, and/or, the second-type light emission control transistor SEM includes the fourth light emission control transistor M13.

A second low level SSL received by the second-type scan transistor SSM is greater than a second low level ESL received by the second-type light emission control transistor SEM. Moreover/alternatively, a second high level SSH received by the second-type scan transistor SSM is greater than a second high level ESH received by the second-type light emission control transistor SEM. With this arrangement, the second low level SL received by the second-type scan transistor SSM may be improved to reduce a voltage difference between the second high level SH of a second-type control signal SC received by the second-type scan transistor SSM and the second low level SL of the second-type control signal SC received by the second-type scan transistor SSM. Alternatively, the second high level SH received by the second-type light emission control transistor SEM may be reduced to reduce a voltage difference between the second high level SH of a second-type control signal SC received by the second-type light emission control transistor SEM and the second low level SL of the second-type control signal SC received by the second-type light emission control transistor SEM. Accordingly, the stability of circuit operation is further improved, and the risk of a display failure is reduced.

Referring to FIGS. 7 to 10, in the second-type control signal SC, the second high level SSH may include one or more of the VGH3, the VGH4, or the VGH8; the second high level ESH may include the VGH5; the second low level SSL may include one or more of the VGL3, the VGL4, or the VGL8; and the second low level ESL may include the VGL5.

The voltage relationship between the second-type control signal SC received by the second-type scan transistor SSM and the second-type control signal FC received by the second-type light emission control transistor SEM may include one or more of the three cases below.

In case 1, SSL>ESL, and SSH>ESH.

In case 2, SSL>ESL, and SSH=ESH.

In case 3, SSL=ESL, and SSH>ESH.

For the case where the second-type light emission control transistor SEM includes the fourth light emission control transistor M13, the fourth light emission control transistor M13 is electrically connected to the connection node N. Before the second drive transistor M8 is not turned on, the potential of the connection node N is lower than the voltage of the second drive voltage end PWM_VH2. The control signal received by the fourth light emission control transistor M13 has a lower low level so that the fourth light emission control transistor M13 is turned on smoothly. It is set that SSL>ESL so that a voltage difference of the second-type control signal SC received by the second-type scan transistor SSM is reduced on the basis that the second-type light emission control transistor SEM receives the lower second low level ESL.

The voltage difference of the second-type control signal SC received by the second-type scan transistor SSM and a voltage difference of the second-type control signal SC received by the second-type light emission control transistor SEM may satisfy the relationship below.

$$\Delta V3 \leq \Delta V4.$$

A third voltage difference ΔV3 is a voltage difference between the second high level SSH of the second-type scan transistor SSM and the second low level SSL of the second-type scan transistor SSM. A fourth voltage difference ΔV4 is a voltage difference between the second high level ESH of the second-type light emission control transistor SEM and the second low level ESL of the second-type light emission control transistor SEM.

For case 1, under the premise that SSL>ESL, the arrangement in which SSH>ESH enables voltage differences to be consistent. That is, ΔV3=ΔV4.

For case 2, under the premise that SSL>ESL, the arrangement in which SSH=ESH reduces the number of different level values to be supplied to the driver circuit, helping reduce the complexity of circuit design.

For the arrangement of a voltage value of the first high level FH of the first-type control signal FC received by the first-type switch transistor FM in the pixel circuit 100, the arrangement of a voltage value of the first low level FL of the first-type control signal FC received by the first-type switch transistor FM in the pixel circuit 100, the arrangement of a voltage value of the second high level SH of the second-type control signal SC received by the second-type switch transistor SM in the pixel circuit 100, and the arrangement of a voltage value of the second low level SL of the second-type control signal SC received by the second-type switch transistor SM in the pixel circuit 100, the potential of the node N1_PAM in the pixel circuit 100 (or the potential of the connection node N), the potential of the node N1_PWM in the pixel circuit 100, and voltage values of various signals received by the pixel circuit 100 need to be considered.

The voltage value of the first high level FH of the first-type control signal FC received by the first-type switch transistor FM in the pixel circuit 100 and the voltage value of the first low level FL of the first-type control signal FC received by the first-type switch transistor FM in the pixel circuit 100 may include the arrangement manner below.

The first drive transistor M1 and the light-emitting element LD are connected in series between the first drive voltage end PVDD and the third drive voltage end PVEE. The first drive voltage at the first drive voltage end PVDD is greater than the third drive voltage at the third drive voltage end PVEE. The potential range [L2, H2] of the gate of the first drive transistor M1 (or the node N1_PAM) is [PAM_REF, PWM_VH2]. In this case, the arrangement manner of the first low level FL of the first-type control signal FC may include the following: FL≤PVEE; or FL≤PAM_REF.

The arrangement manner of the first high level FH of the first-type control signal FC may include: FH≥PVDD; or FH≥PWM_VH2.

Because the second drive voltage PWM_VH2 is configured to turn off the first drive transistor M1 (as shown in FIGS. 2 and 3) or turn off the light emission duration control transistor M15 (as shown in FIG. 4), the second drive voltage PWM_VH2 needs to be greater than or equal to the voltage of the source of the first drive transistor M1 or the voltage of the drain of the first drive transistor M1, for example, the first drive voltage PVDD. Therefore, it is set that PWM_VH2≥PVDD, guaranteeing that the first drive transistor M1 or the light emission duration control transistor M15 is smoothly turned off under the control of the second drive voltage PWM_VH2 and stops supplying the drive current to the light-emitting element LD. On this basis, the first high level FH of the first-type control signal FC may be set to satisfy that FH≥PWM_VH2.

The voltage value of the second high level SH of the second-type control signal SC received by the second-type switch transistor SM in the pulse width modulation circuit 120 and the voltage value of the second low level SL of the second-type control signal SC received by the second-type switch transistor SM in the pulse width modulation circuit 120 may include the arrangement manner below.

For the case where the sweep signal SWEEP adopts the manner in FIG. 7, the potential changing range [L1, H1] of the node N1_PWM is [min (PWM_REF, MIN_DATA+Vth2−ΔSWEEP), MAX_DATA+Vth2] or [min (PWM_REF, MIN_DATA−ΔSWEEP), MAX_DATA]. Moreover, the second drive transistor M8 is connected in series between the second drive voltage end PWM_VH2 and the connection node N. In this case, the arrangement manner of the second low level SL of the second-type control signal SC may include the following: SL≤PWM_REF; SL≤MIN_DATA+Vth2−ΔSWEEP; or SL≤MIN_DATA−ΔSWEEP.

The arrangement manner of the second high level SH of the second-type control signal SC may include the following: SH≥MAX_DATA+Vth2; SH≥MAX_DATA; or SH≥PWM_VH2.

For the second drive transistor M8, after the third light emission control transistor M12 is turned on, the potential of the source of the second drive transistor M8 is the second drive voltage PWM_VH2. To control the second drive transistor M8 to turn off, the maximum voltage value H1 of the potential of the gate of the second drive transistor M8 (or the node N1_PWM) needs to be greater than or equal to the second drive voltage PWM_VH2. That is, H1≥PWM_VH2.

For the case where the sweep signal SWEEP adopts the manner in FIG. 9, the potential changing range [L1, H1] of the node N1_PWM is [PWM_REF, MAX_DATA+Vth2+ΔSWEEP] or [PWM_REF, MAX_DATA+ΔSWEEP]. Moreover, the second drive transistor M8 is connected in series between the second drive voltage end PWM_VH2 and the connection node N. In this case, the arrangement manner of the second low level SL of the second-type control signal SC may include the following: SL≤PWM_REF.

The arrangement manner of the second high level SH of the second-type control signal SC may include the following: SH≥MAX_DATA+Vth2+ΔSWEEP; SH≥MAX_DATA+ΔSWEEP; or SH≥PWM_VH2.

Based on the preceding arrangement manners of the first-type control signal FC and the second-type control signal SC as well as the relationship between the first low level FL of the first-type control signal FC and the second low level SL of the second-type control signal SC that SL>FL, it may be set that a second reset voltage is greater than or equal to the first reset voltage PAM_REF, helping reduce the voltage difference of the first-type control signal FC or reduce the voltage difference of the second-type control signal SC.

The pixel circuit 100 further includes a third-type switch transistor TM. As shown in FIG. 4, the pixel circuit 100 further includes the reset circuit 130. The reset circuit 130 includes the third-type switch transistor TM. A gate of the third-type switch transistor TM receives a third-type control signal TC. The third-type control signal includes a third high level TH and a third low level TL. The third low level TL is less than the first low level FL of the first-type control signal FC.

The third-type switch transistor TM includes the reset transistor M16. The reset transistor M16 in the reset circuit 130 is configured to introduce the reset voltage VSET to the connection node N. Therefore, the reset transistor M16 needs to receive a lower low level so as to be turned on smoothly. Therefore, it is set that TL<FL. Illustratively, it may be set that VSET<PAM_REF.

Referring to FIG. 8, the third high level TH of the third-type control signal TC includes a VGH9, and the third low level includes a VGL9.

Figure 11:
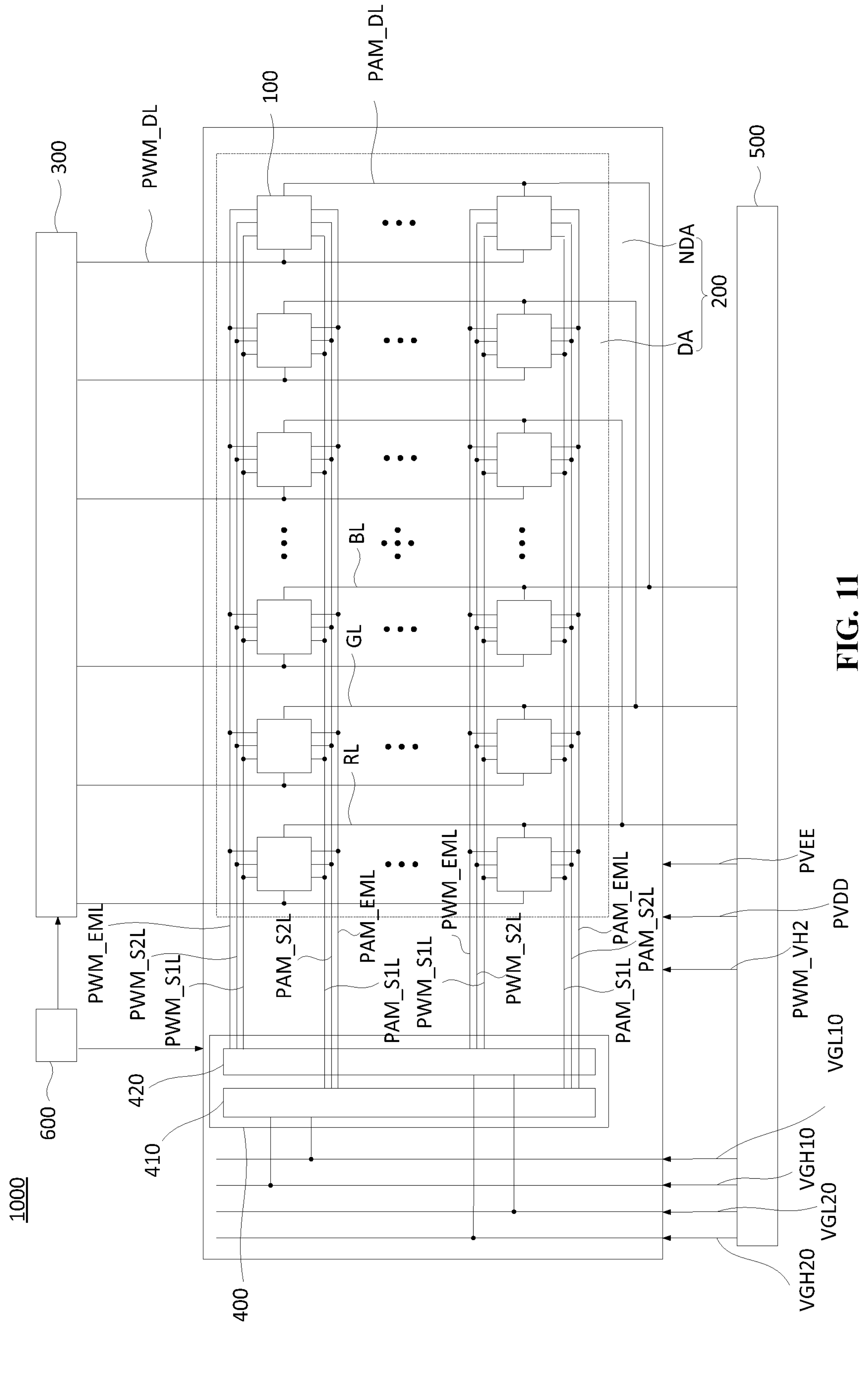
FIG. 11 is a block diagram of a display device according to an embodiment of the present application.

FIG. 11 is a block diagram of a display device according to an embodiment of the present application.

The display device 1000 includes a display panel 200, a source driver 300, a driver circuit 400, a power unit 500, and a timing controller 600.

A display area DA of the display panel 200 may include pixel circuits 100 for displaying an image, light-emitting elements LD (not shown) electrically connected to the pixel circuits 100, and first reset scan lines PAM_S1L, first data write scan lines PAM_S2L, first light emission control lines PAM_EML, second reset scan lines PWM_S1L, second data write scan lines PWM_S2L, second light emission control lines PWM_EML, drive data lines PAM_DL and pulse width data lines PWM_DL that are connected to the pixel circuits 100.

A pixel circuit may be connected to any one of the first reset scan lines PAM_S1L, any one of the first data write scan lines PAM_S2L, any one of the first light emission control lines PAM_EML, any one of the second reset scan lines PWM_S1L, any one of the second data write scan lines PWM_S2L, any one of the second light emission control lines PWM_EML, any one of the drive data lines PAM_DL, and any one of the pulse width data lines PWM_DL.

The first reset scan lines PAM_S1L supply first reset scan signals PAM_S1. The first data write scan lines PAM_S2L supply drive data write scan signals PAM_S2. The first light emission control lines PAM_EML supply light emission control signals PAM_EM. The second reset scan lines PWM_S1L supply second reset scan signals PWM_S1. The second data write scan lines PWM_S2L supply pulse width data write scan signals PWM_S2. The second light emission control lines PWM_EML supply light emission control signals PWM_EM. The drive data lines PAM_DL supply drive data PAM_DATA. The pulse width data lines PWM_DL supply pulse width data PWM_DATA.

The source driver 300 is configured to supply the pulse width data PWM_DATA to the pulse width data lines PWM_DL.

The driver circuit 400 is configured to supply control signals to the pixel circuits 100. The driver circuit 400 may be electrically connected to the first reset scan lines PAM_S1L, the first data write scan lines PAM_S2L, the first light emission control lines PAM_EML, the second reset scan lines PWM_S1L, the second data write scan lines PWM_S2L, and the second light emission control lines PWM_EML and outputs the control signals to the signal lines.

The driver circuit 400 includes a first-type driver circuit 410, a second-type driver circuit 420, a first-type high level line VGH10, a first-type low level line VGL10, a second-type high level line VGH20, and a second-type low level line VGL20. The number of various types of level lines may be set according to needs.

The first-type driver circuit 410 is configured to supply a first-type control signal FC to the pixel circuits 100. The first-type control signal FC includes a first high level FH and a first low level FL.

The second-type driver circuit 420 is configured to supply a second-type control signal SC to the pixel circuits 100. The second-type control signal SC includes a second high level SH and a second low level SL.

The first-type high level line VGH10 is electrically connected to the first-type driver circuit 410 and configured to supply the first high level FH to the first-type driver circuit 410.

The first-type low level line VGL10 is electrically connected to the first-type driver circuit 410 and configured to supply the first low level FL to the first-type driver circuit 410.

The second-type high level line VGH20 is electrically connected to the second-type driver circuit 420 and configured to supply the second high level SH to the second-type driver circuit 420.

The second-type low level line VGL20 is electrically connected to the second-type driver circuit 420 and configured to supply the second low level SL to the second-type driver circuit 420.

SH≠FH, and/or SL≠FL.

In one or more embodiments, SH>FH, and/or SL>FL.

Figure 13:
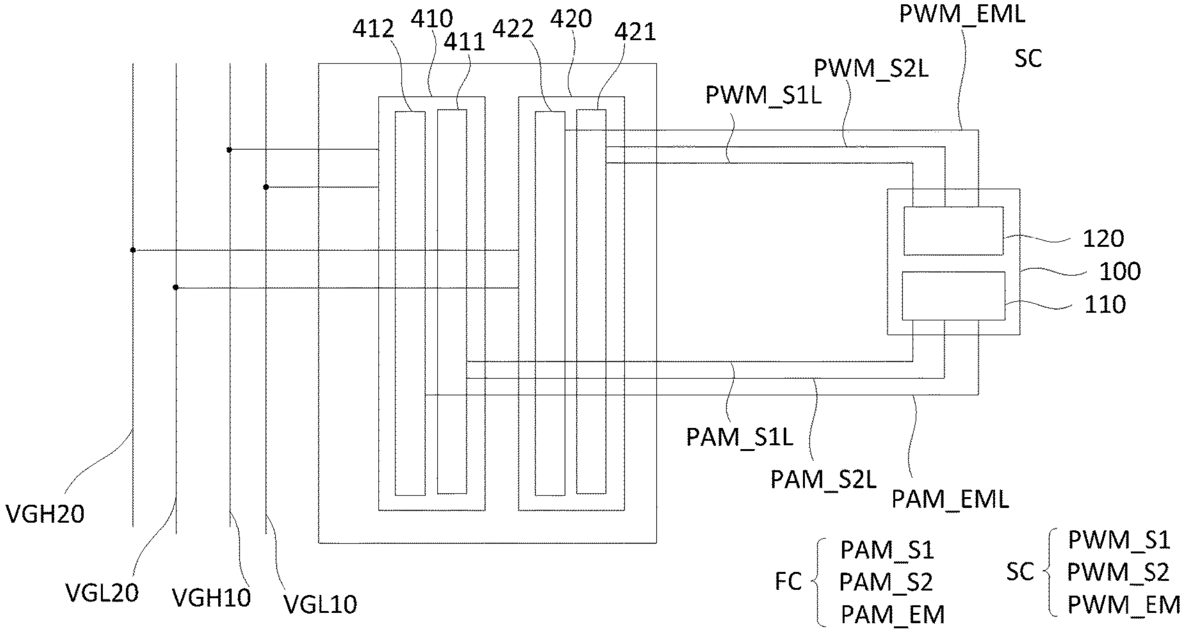
Figure 14:
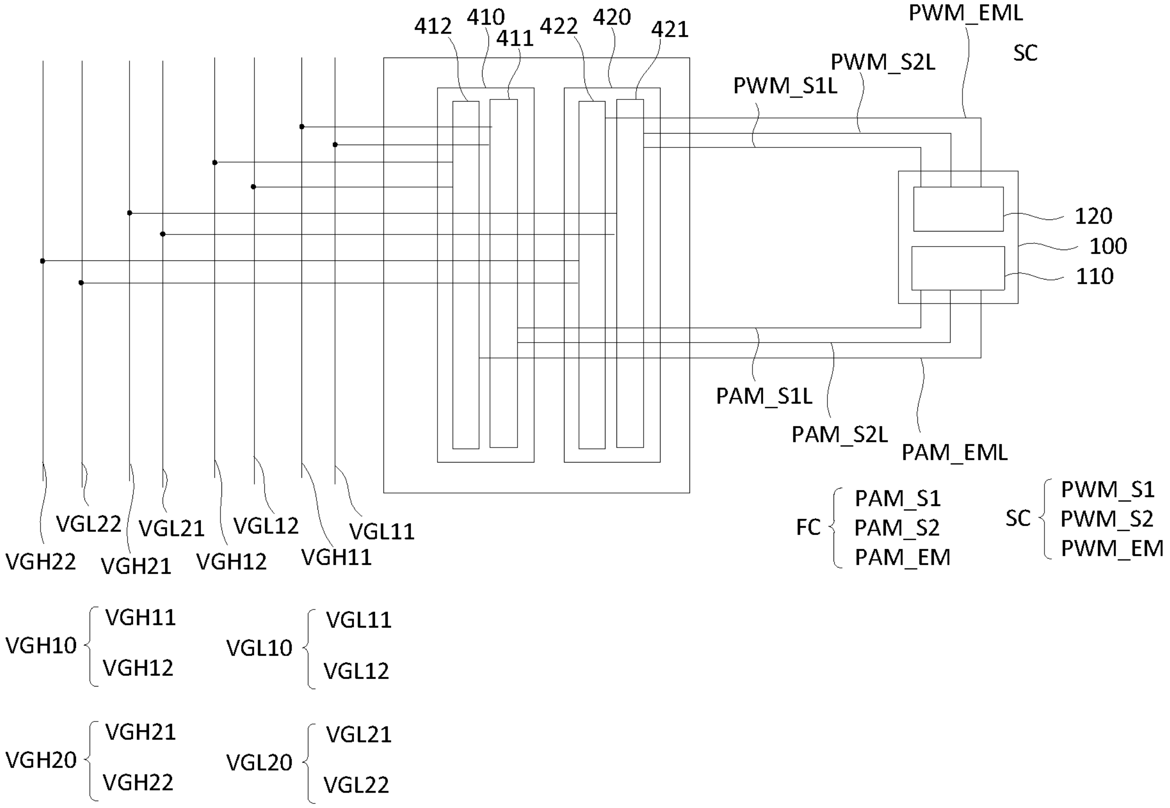
Figure 15:
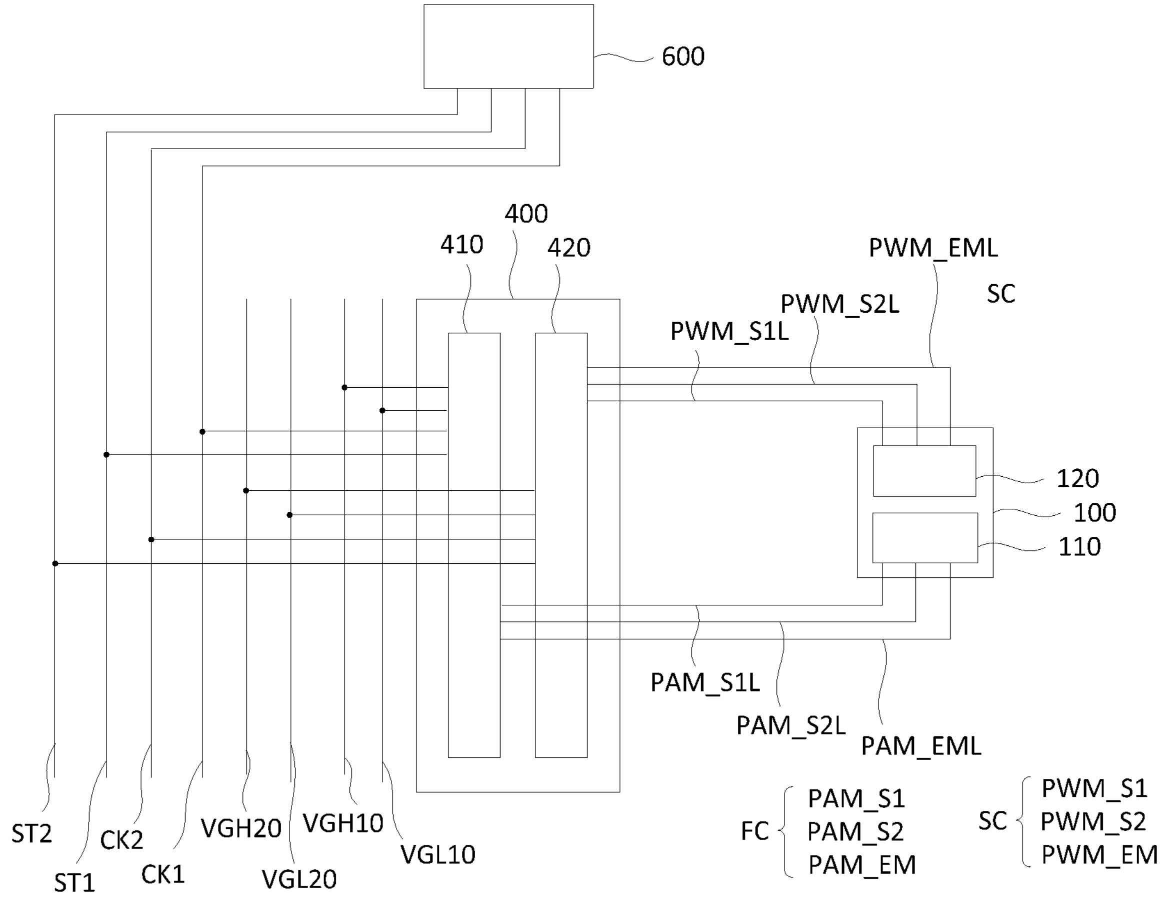

FIGS. 12 to 15 are diagrams illustrating the connection relationship between a driver circuit and a pixel circuit according to embodiments of the present application. To display the technical solution clearly, FIGS. 12 to 15 illustrate the driver circuit in the display panel and one pixel circuit. FIG. 15 further includes the timing controller.

Figure 12:
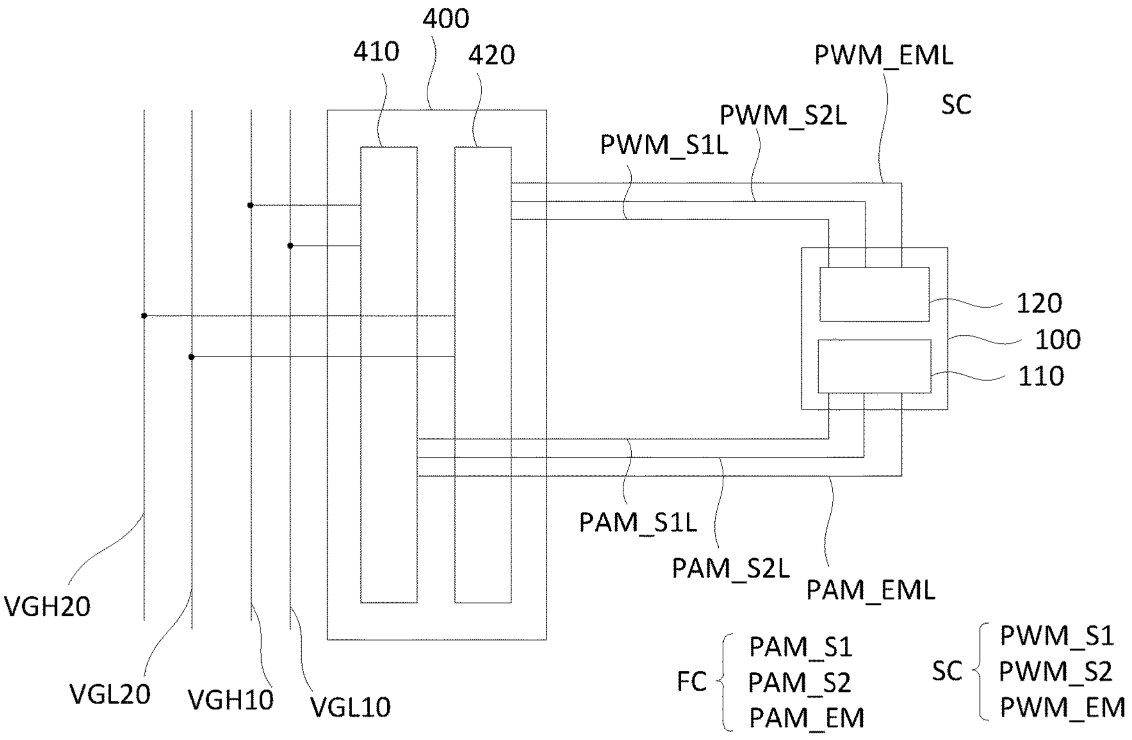
FIGS. 12 to 15 are diagrams illustrating the connection relationship between a driver circuit and a pixel circuit according to embodiments of the present application.

As shown in FIG. 12, the pixel circuit 100 includes a current driving circuit 110 and a pulse width modulation circuit 120. The current driving circuit 110 is configured to supply a drive current to a light-emitting element LD. The pulse width modulation circuit 120 is configured to control the light emission duration of the light-emitting element LD. The first-type driver circuit 410 is configured to supply the first-type control signal FC to the current driving circuit 110. The second-type driver circuit 420 is configured to supply the second-type control signal SC to the pulse width modulation circuit 120.

For the relevant description of the pixel circuit 100, reference may be made to any embodiment of a pixel circuit provided in the present application.

As shown in FIG. 13, the first-type driver circuit 410 includes a first scan driving circuit 411 and a first light emission driving circuit 412. The first scan driving circuit 411 is electrically connected to a first reset scan line PAM_S1L and a first data write scan line PAM_S2L and supplies a first reset scan signal PAM_S1 and a drive data write scan signal PAM_S2 to the pixel circuit 100. The first light emission driving circuit 412 is electrically connected to a first light emission control line PAM_EML and supplies a light emission control signal PAM_EM to the pixel circuit 100. The second-type driver circuit 420 includes a second scan driving circuit 421 and a second light emission driving circuit 422. The second scan driving circuit 421 is electrically connected to a second reset scan line PWM_S1L and a second data write scan line PAM_S2L and supplies a second reset scan signal PWM_S1 and a pulse width data write scan signal PWM_S2 to the pixel circuit 100. The second light emission driving circuit 422 is electrically connected to the second light emission control line PWM_EML and supplies a light emission control signal PWM_EM to the pixel circuit 100.

As shown in FIG. 14, the first-type driver circuit 410 includes a first scan driving circuit 411 and a first light emission driving circuit 412. The first scan driving circuit 411 is configured to supply a first-type scan signal to a first-type scan transistor FSM of the pixel circuit 100. The first light emission driving circuit 412 is configured to supply a first-type light emission control signal to a first-type light emission control transistor FEM of the pixel circuit 100.

The first-type high level line VGH10 includes a first high level line VGH11 and a second high level line VGH12. The first high level line VGH11 is electrically connected to the first scan driving circuit 411. The second high level line VGH12 is electrically connected to the first light emission driving circuit 412.

The first-type low level line VGL10 includes a first low level line VGL11 and a second low level line VGL12. The first low level line VGL11 is electrically connected to the first scan driving circuit 411. The second low level line VGL12 is electrically connected to the first light emission driving circuit 412.

The second-type driver circuit 420 includes a second scan driving circuit 421 and a second light emission driving circuit 422. The second scan driving circuit 421 is configured to supply a second-type scan signal to a second-type scan transistor SSM of the pixel circuit 100. The second light emission driving circuit 422 is configured to supply a second-type light emission control signal to a second-type light emission control transistor SEM of the pixel circuit 100.

The second-type high level line VGH20 includes a third high level line VGH21 and a fourth high level line VGH12. The third high level line VGH21 is electrically connected to the second scan driving circuit 421. The fourth high level line VGH22 is electrically connected to the second light emission driving circuit 422.

The second-type low level line VGL20 includes a third low level line VGL21 and a fourth low level line VGL22. The third low level line VGL21 is electrically connected to the second scan driving circuit 421. The fourth low level line VGL22 is electrically connected to the second light emission driving circuit 422.

Voltages supplied by the first to fourth high level lines and voltages supplied by the first to fourth low level lines may include the arrangement manner below.

A first high level SFH supplied by the first high level line VGH11 is greater than a first high level EFH supplied by the second high level line VGH12. Moreover/alternatively, a first low level SFL supplied by the first low level line VGL11 is greater than a first low level EFL supplied by the second low level line VGL12.

A second high level SSH supplied by the third high level line VGH21 is greater than a second high level ESH supplied by the fourth high level line VGH22. Moreover/alternatively, a second low level SSL supplied by the third low level line VGL21 is greater than a second low level ESL supplied by the fourth low level line VGL22.

Figure 16:
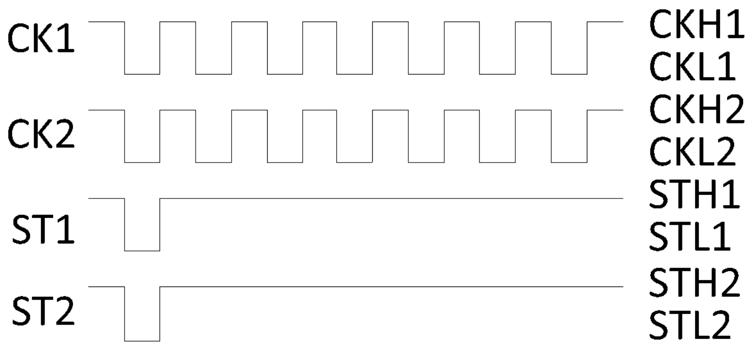
FIG. 16 is a diagram of clock signals and start signals according to an embodiment of the present application.

FIG. 16 is a diagram of clock signals and start signals according to an embodiment of the present application. It is to be noted that FIG. 16 illustrates high levels and low levels of the clock signals and high levels and low levels of the start signals and does not limit specific signal waveforms and timing. The waveforms and timing of the clock signals and start signals may be set according to needs.

As shown in FIGS. 15 and 16, the driver circuit 400 further includes a first-type clock signal line CK1, a second-type clock signal line CK2, a first-type start signal line ST1, and a second-type start signal line ST2.

The first-type clock signal line CK1 is electrically connected to the first-type driver circuit 410 and configured to supply a first-type clock signal CK1 to the first-type driver circuit 410. A high level CKH1 of the first-type clock signal is less than or equal to the first high level FH. A low level CKL1 of the first-type clock signal CK1 is greater than or equal to the first low level FL.

The first-type start signal line ST1 is electrically connected to the first-type driver circuit 410 and configured to supply a first-type start signal ST1 to the first-type driver circuit 410. A high level STH1 of the first-type start signal ST1 is less than or equal to the first high level FH. A low level STL1 of the first-type start signal ST1 is greater than or equal to the first low level FL.

The second-type clock signal line CK2 is electrically connected to the second-type driver circuit 420 and configured to supply a second-type clock signal CK2 to the second-type driver circuit 420. A high level CKH2 of the second-type clock signal CK2 is less than or equal to the second high level SH. A low level CKL2 of the second-type clock signal CK2 is greater than or equal to the second low level SL.

The second-type start signal line ST2 is electrically connected to the second-type driver circuit 420 and configured to supply a second-type start signal ST2 to the second-type driver circuit 420. A high level STH2 of the second-type start signal ST2 is less than or equal to the second high level SH. A low level STL2 of the second-type start signal ST2 is greater than or equal to the second low level SL.

The first-type clock signal line CK1, the second-type clock signal line CK2, the first-type start signal line ST1, and the second-type start signal line ST2 may be supplied by the timing controller 600.

In FIG. 16, signal lines in each type are illustrated via one signal line. The number of signal lines in each type and the type of transmitted signals may be set according to needs. For example, clock signal lines in each type may include two clock signal lines (CK and CKB) with contrary phases. Start signal lines in each type may include a start signal line including a scan driving circuit and a start signal line including a light emission driving circuit.

As shown in FIG. 11, the power unit 500 may be connected to the drive data lines PAM_DL and supply the drive data PAM_DATA to the drive data lines PAM_DL. The drive data lines PAM_DL may include red data lines RL, green data lines GL and blue data lines BL that supply the drive data PAM_DATA to pixel circuits connected to red light-emitting elements, pixel circuits connected to green light-emitting elements and pixel circuits connected to blue light-emitting elements respectively. The drive data lines PAM_DL may also be set according to the manner of the pulse width data lines and be provided with signals by the source driver 300.

Figure 17:
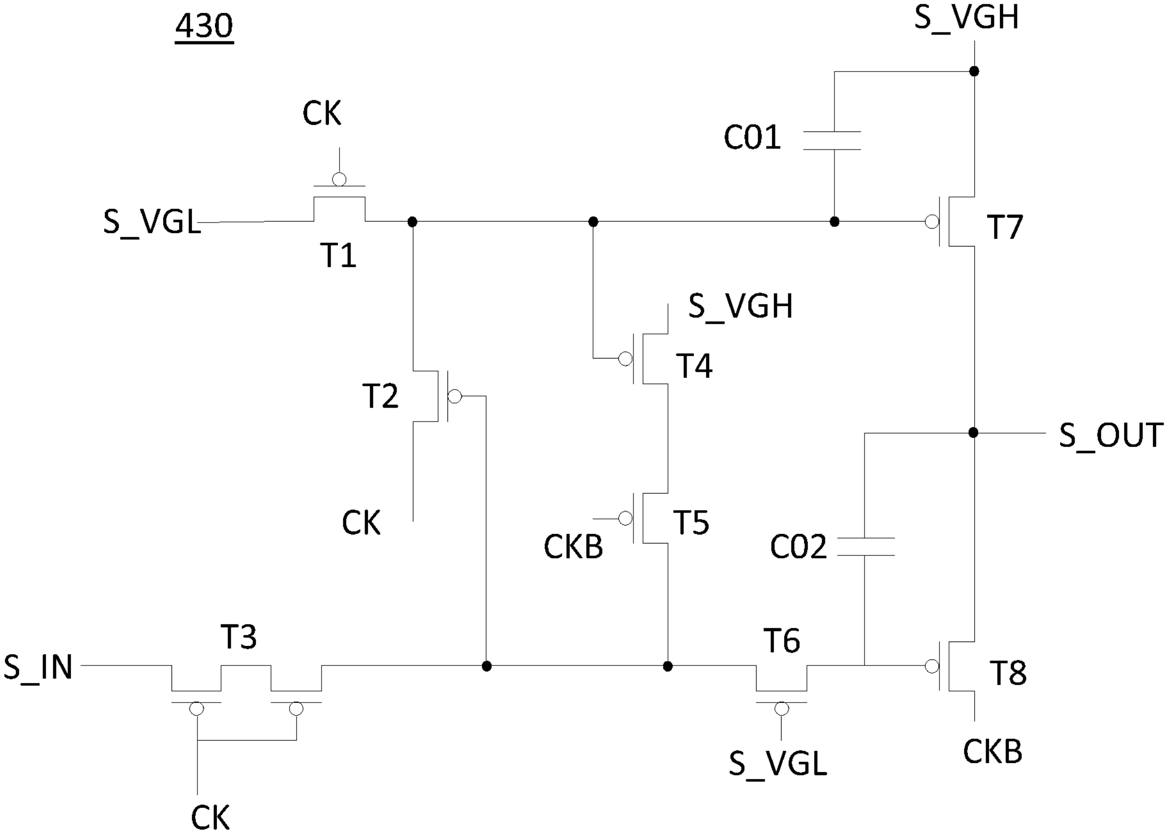
FIGS. 17 and 18 are diagrams of shift registers according to embodiments of the present application.
Figure 18:
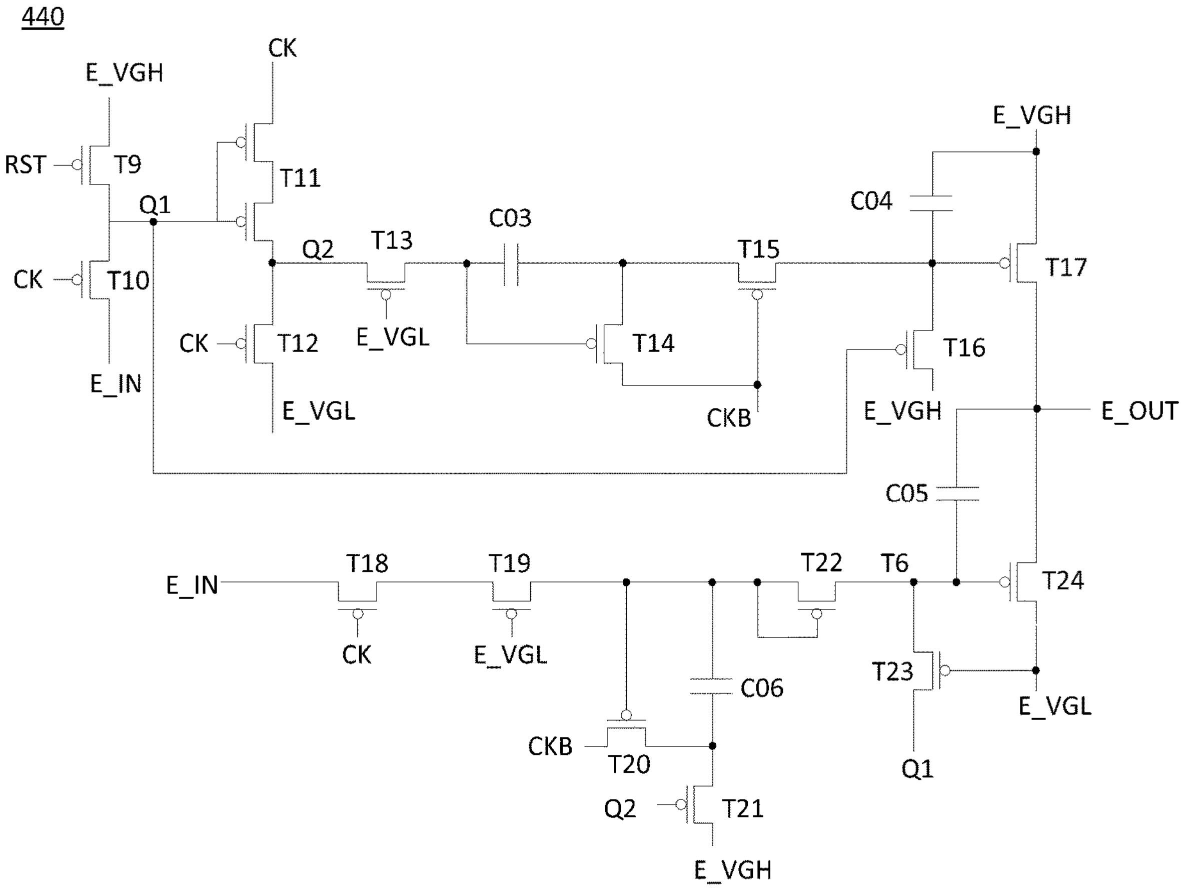

FIGS. 17 and 18 are diagrams of shift registers according to embodiments of the present application.

The driver circuit 400 includes scan driving circuits (411 and 421) and light emission driving circuits (412 and 422).

The scan driving circuits include multiple scan shift registers 430 arranged in cascade. As shown in FIG. 17, a scan shift register 430 includes transistors T1 to T8 and capacitors C01 and C02. Signal ports of the scan shift register 430 include a signal input end S_IN, clock signal ends CK and CKB, a high level end S_VGH, a low level end S_VGL, and a signal output end S_OUT. A signal input end S_IN of a first-stage shift register is connected to start signal lines (for example, ST1 and ST2). A signal input end S_IN of a shift register apart from the first-stage shift register is connected to a signal output end S_OUT of the previous stage. Clock signal ends CK and CKB are connected to clock signal lines (for example, CK1 and CK2). The high level end S_VGH is connected to high level lines (for example, VGH10, VGH11, VGH20, and VGH21). The low level end S_VGL is connected to low level lines (for example, VGL10, VGL11, VGL20, and VGL21).

The light emission driving circuits include multiple light emission shift registers 440 arranged in cascade. As shown in FIG. 18, a light emission shift register 440 includes transistors T9 to T24 and capacitors C03 and C06. Signal ports of the light emission shift register 440 include a signal input end E_IN, clock signal ends CK and CKB, a high level end E_VGH, a low level end E_VGL, and a signal output end E_OUT. A signal input end E_IN of a first-stage shift register is connected to start signal lines (for example, ST1 and ST2). A signal input end E_IN of a shift register apart from the first-stage shift register is connected to a signal output end E_OUT of the previous stage. Clock signal ends CK and CKB are connected to clock signal lines (for example, CK1 and CK2). The high level end E_VGH is connected to high level lines (for example, VGH10, VGH12, VGH20, and VGH22). The low level end E_VGL is connected to low level lines (for example, VGL10, VGL12, VGL20, and VGL22).

Figure 19:
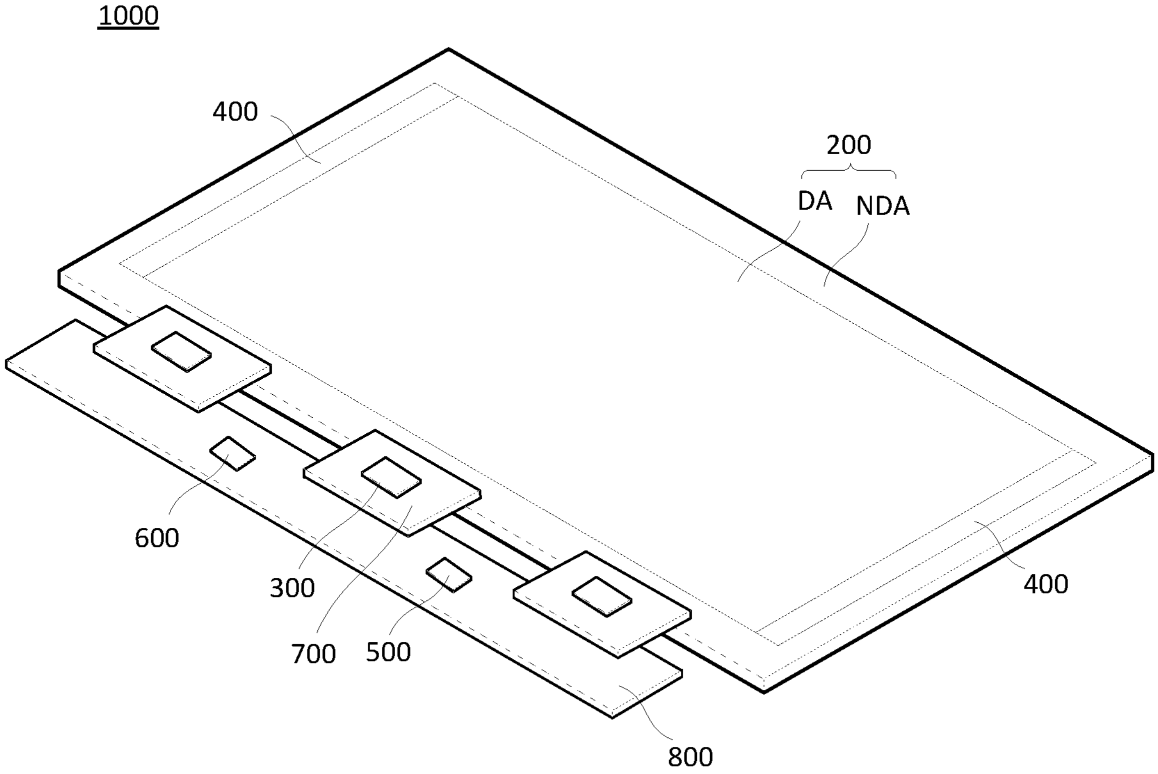
FIGS. 19 and 20 are diagrams of a display device according to embodiments of the present application.
Figure 20:
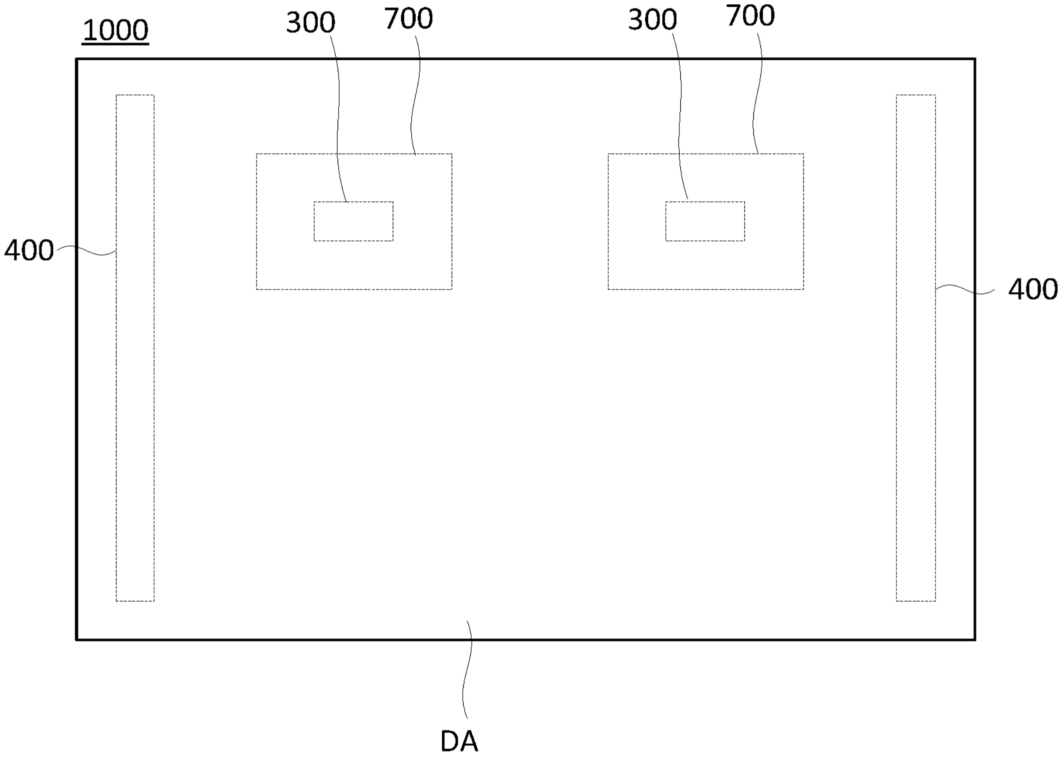

FIGS. 19 and 20 are diagrams of a display device according to embodiments of the present application.

As shown in FIG. 19, the display device 1000 includes a display panel 200, a source circuit board 700, and a control circuit board 800. The display panel 200 may be connected to the control circuit board 800 through the source circuit board 700. A source driver 300 may be disposed on the source circuit board 700. A power unit 500 and a timing controller 600 may be disposed on the control circuit board 800.

As shown in FIG. 20, the difference from FIG. 19 lies in that the display panel 200 does not include a non-display area NDA. A driver circuit 400 is located in a display region DA. The source circuit board 700 that is provided with the source driver 300 and is on the source driver 300 is located on a rear surface of the display panel 200.

Referring to FIGS. 11, 19, and 20, the display device according to the present application may be used as a display screen in a portable electronic device (such as a mobile phone, a smartphone, a tablet personal computer (PC), a smartwatch, a watch phone, a mobile communication terminal, an electronic notebook, an electronic book, a portable multimedia player (PMP), a wearable display device, and a camera) and various products (such as a television, a notebook computer, a monitor, a billboard, an Internet of Things device, a vehicle-mounted device, a medical device, and an industrial control device).

The preceding description of the disclosed embodiments enables those skilled in the art to implement or use the present application. Various modifications to these embodiments will be apparent to those skilled in the art, and the general principles defined herein may be implemented in other embodiments without departing from the spirit or scope of the present application. Therefore, the present application is not intended to be limited to the embodiments shown herein but is to accord the widest scope consistent with the principles and novel features disclosed herein.

What is claimed is:

1. A pixel circuit, comprising a first-type switch transistor and a second-type switch transistor;

a gate of the first-type switch transistor is configured to receive a first-type control signal, and the first-type control signal comprises a first high level and a first low level;

a gate of the second-type switch transistor is configured to receive a second-type control signal, and the second-type control signal comprises a second high level and a second low level; and wherein at least one of following configurations is met: the first high level is not equal to the second high level, and the first low level is not equal to the second low level;

wherein the pixel circuit further comprises a current driving circuit configured to supply a drive current to a light-emitting element; and a pulse width modulation circuit configured to control a light emission duration of the light-emitting element based on pulse width data and a sweep signal, wherein the current driving circuit comprises the first-type switch transistor, and the pulse width modulation circuit comprises the second-type switch transistor; and at least one of following configurations is met: the second high level is greater than the first high level, and the second low level is greater than the first low level; and wherein the current driving circuit comprises a first drive transistor, a first reset transistor, a drive data write circuit, and a first light emission control circuit; the first drive transistor and the first light emission control circuit are connected in series between a first drive voltage end and the light-emitting element; the first reset transistor is configured to transmit a first reset voltage supplied by a first reset voltage end to a gate of the first drive transistor; the drive data write circuit is configured to transmit drive data; and the first-type switch transistor comprises at least one of following transistors: the first reset transistor, at least one transistor in the drive data write circuit, and at least one transistor in the first light emission control circuit; and the pulse width modulation circuit comprises a second drive transistor, a second reset transistor, a pulse width data write circuit, and a second light emission control circuit; the second drive transistor and the second light emission control circuit are connected in series between a second drive voltage end and a connection node; the pulse width modulation circuit is electrically connected to the current driving circuit at the connection node; the second reset transistor is configured to transmit a second reset voltage supplied by a second reset voltage end to a gate of the second drive transistor; the pulse width data write circuit is configured to transmit the pulse width data; and the second-type switch transistor comprises at least one of following transistors: the second reset transistor, at least one transistor in the pulse width data write circuit, and at least one transistor in the second light emission control circuit.

2. The pixel circuit according to claim 1, wherein the first-type switch transistor comprises a first-type scan transistor and a first-type light emission control transistor, the first-type scan transistor comprises at least one of following transistors: the first reset transistor and at least one transistor in the drive data write circuit; the first-type light emission control transistor comprises at least one transistor in the first light emission control circuit;

at least one of following configurations is met: a first low level of the first-type scan transistor is greater than a first low level of the first-type light emission control transistor, and a first high level of the first-type scan transistor is greater than a first high level of the first-type light emission control transistor; and a first voltage difference is a voltage difference between the first high level of the first-type scan transistor and the first low level of the first-type scan transistor, a second voltage difference is a voltage difference between the first high level of the first-type light emission control transistor and the first low level of the first-type light emission control transistor, and the first voltage difference is less than or equal to the second voltage difference.

3. The pixel circuit according to claim 1, wherein the second-type switch transistor comprises a second-type scan transistor and a second-type light emission control transistor, the second-type scan transistor comprises at least one of following transistors: the second reset transistor and at least one transistor in the pulse width data write circuit; the second-type light emission control transistor comprises at least one transistor in the second light emission control circuit;

at least one of following configurations is met: a second low level of the second-type scan transistor is greater than a second low level of the second-type light emission control transistor, and a second high level of the second-type scan transistor is greater than a second high level of the second-type light emission control transistor; and a third voltage difference is a voltage difference between the second high level of the second-type scan transistor and the second low level of the second-type scan transistor, a fourth voltage difference is a voltage difference between the second high level of the second-type light emission control transistor and the second low level of the second-type light emission control transistor, and the third voltage difference is less than or equal to the fourth voltage difference.

4. The pixel circuit according to claim 1, wherein the first drive transistor and the light-emitting element are connected in series between the first drive voltage end and a third drive voltage end, and a first drive voltage at the first drive voltage end is greater than a third drive voltage at the third drive voltage end; and the first low level is less than or equal to the first reset voltage, or the first low level is less than or equal to the third drive voltage.

5. The pixel circuit according to claim 1, wherein the first high level is greater than or equal to a second drive voltage supplied by the second drive voltage end; and the second drive voltage is greater than or equal to a first drive voltage supplied by the first drive voltage end.

6. The pixel circuit according to claim 1, wherein the second low level is less than or equal to the second reset voltage; or the second low level is less than or equal to a difference between a minimum value of the pulse width data and a sweep signal voltage difference, wherein the sweep signal voltage difference is a voltage difference between a maximum value of the sweep signal and a minimum value of the sweep signal.

7. The pixel circuit according to claim 1, wherein at least one of following configurations is met:

the second high level is greater than or equal to a maximum value of the pulse width data;

the second high level is greater than or equal to a sum of a maximum value of the pulse width data and a sweep signal voltage difference, wherein the sweep signal voltage difference is a voltage difference between a maximum value of the sweep signal and a minimum value of the sweep signal; and the second high level is greater than or equal to a second drive voltage supplied by the second drive voltage end.

8. The pixel circuit according to claim 1, wherein the current driving circuit further comprises a third reset transistor, and the third reset transistor is configured to transmit a third reset voltage supplied by a third reset voltage end to a first electrode of the light-emitting element; and the first-type switch transistor further comprises the third reset transistor.

9. The pixel circuit according to claim 1, wherein the connection node is the gate of the first drive transistor; or the current driving circuit further comprises a light emission duration control transistor, the light emission duration control transistor is connected to the first drive transistor in series, and the connection node is a gate of the light emission duration control transistor.

10. The pixel circuit according to claim 1, wherein a first-type voltage difference is a voltage difference between the first high level and the first low level, a second-type voltage difference is a voltage difference between the second high level and the second low level, and the first-type voltage difference is less than or equal to the second-type voltage difference.

11. The pixel circuit according to claim 1, further comprising a reset circuit, wherein the current driving circuit is electrically connected to the pulse width modulation circuit at a connection node, and the reset circuit is electrically connected between a reset voltage end and the connection node; and the reset circuit comprises a third-type switch transistor, a gate of the third-type switch transistor receives a third-type control signal, the third-type control signal comprises a third high level and a third low level, and the third low level is less than the first low level.

12. A driver circuit configured to supply a control signal to a pixel circuit, comprising:

a first-type driver circuit configured to supply a first-type control signal to the pixel circuit, wherein the first-type control signal comprises a first high level and a first low level;

a second-type driver circuit configured to supply a second-type control signal to the pixel circuit, wherein the second-type control signal comprises a second high level and a second low level;

a first-type high level line electrically connected to the first-type driver circuit and configured to supply the first high level to the first-type driver circuit;

a first-type low level line electrically connected to the first-type driver circuit and configured to supply the first low level to the first-type driver circuit;

a second-type high level line electrically connected to the second-type driver circuit and configured to supply the second high level to the second-type driver circuit; and a second-type low level line electrically connected to the second-type driver circuit and configured to supply the second low level to the second-type driver circuit, wherein at least one of following configurations is met:

the first high level is not equal to the second high level, and the first low level is not equal to the second low level.

13. The driver circuit according to claim 12, wherein at least one of following configurations is met:

the second high level is greater than the first high level, and the second low level is greater than the first low level.

14. The driver circuit according to claim 13, wherein the pixel circuit comprises a current driving circuit and a pulse width modulation circuit, the current driving circuit is configured to supply a drive current to a light-emitting element, and the pulse width modulation circuit is configured to control a light emission duration of the light-emitting element;

the first-type driver circuit is configured to supply the first-type control signal to the current driving circuit; and the second-type driver circuit is configured to supply the second-type control signal to the pulse width modulation circuit.

15. The driver circuit according to claim 13, comprising:

the first-type driver circuit comprises a first scan driving circuit and a first light emission driving circuit, the first scan driving circuit is configured to supply a first-type scan signal to a first-type scan transistor of the pixel circuit, and the first light emission driving circuit is configured to supply a first-type light emission control signal to a first-type light emission control transistor of the pixel circuit;

the first-type high level line comprises a first high level line and a second high level line, the first high level line is electrically connected to the first scan driving circuit, and the second high level line is electrically connected to the first light emission driving circuit;

the first-type low level line comprises a first low level line and a second low level line, the first low level line is electrically connected to the first scan driving circuit, and the second low level line is electrically connected to the first light emission driving circuit;

the second-type driver circuit comprises a second scan driving circuit and a second light emission driving circuit, the second scan driving circuit is configured to supply a second-type scan signal to a second-type scan transistor of the pixel circuit, and the second light emission driving circuit is configured to supply a second-type light emission control signal to a second-type light emission control transistor of the pixel circuit;

the second-type high level line comprises a third high level line and a fourth high level line, the third high level line is electrically connected to the second scan driving circuit, and the fourth high level line is electrically connected to the second light emission driving circuit; and the second-type low level line comprises a third low level line and a fourth low level line, the third low level line is electrically connected to the second scan driving circuit, and the fourth low level line is electrically connected to the second light emission driving circuit;

wherein at least one of following configurations is met: a first high level supplied by the first high level line is greater than a first high level supplied by the second high level line, and a first low level supplied by the first low level line is greater than a first low level supplied by the second low level line; and wherein at least one of following configurations is met: a second high level supplied by the third high level line is greater than a second high level supplied by the fourth high level line, and a second low level supplied by the third low level line is greater than a second low level supplied by the fourth low level line.

16. The driver circuit according to claim 12, further comprising:

a first-type clock signal line electrically connected to the first-type driver circuit and configured to supply a first-type clock signal to the first-type driver circuit, wherein a high level of the first-type clock signal is less than or equal to the first high level, and a low level of the first-type clock signal is greater than or equal to the first low level;

a first-type start signal line electrically connected to the first-type driver circuit and configured to supply a first-type start signal to the first-type driver circuit, wherein a high level of the first-type start signal is less than or equal to the first high level, and a low level of the first-type start signal is greater than or equal to the first low level;

a second-type clock signal line electrically connected to the second-type driver circuit and configured to supply a second-type clock signal to the second-type driver circuit, wherein a high level of the second-type clock signal is less than or equal to the second high level, and a low level of the second-type clock signal is greater than or equal to the second low level; and a second-type start signal line electrically connected to the second-type driver circuit and configured to supply a second-type start signal to the second-type driver circuit, wherein a high level of the second-type start signal is less than or equal to the second high level, and a low level of the second-type start signal is greater than or equal to the second low level.

17. A display panel, comprising a pixel circuit and a driver circuit, wherein the driver circuit is configured to supply a control signal to the pixel circuit;

wherein the pixel circuit, comprising a first-type switch transistor and a second-type switch transistor;

a gate of the first-type switch transistor is configured to receive a first-type control signal, and the first-type control signal comprises a first high level and a first low level;

a gate of the second-type switch transistor is configured to receive a second-type control signal, and the second-type control signal comprises a second high level and a second low level; and wherein at least one of following configurations is met: the first high level is not equal to the second high level, and the first low level is not equal to the second low level;

wherein the driver circuit comprising:

a first-type driver circuit configured to supply a first-type control signal to the pixel circuit, wherein the first-type control signal comprises a first high level and a first low level;

a second-type driver circuit configured to supply a second-type control signal to the pixel circuit, wherein the second-type control signal comprises a second high level and a second low level;

a first-type high level line electrically connected to the first-type driver circuit and configured to supply the first high level to the first-type driver circuit;

a first-type low level line electrically connected to the first-type driver circuit and configured to supply the first low level to the first-type driver circuit;

a second-type high level line electrically connected to the second-type driver circuit and configured to supply the second high level to the second-type driver circuit; and a second-type low level line electrically connected to the second-type driver circuit and configured to supply the second low level to the second-type driver circuit, wherein at least one of following configurations is met: the first high level is not equal to the second high level, and the first low level is not equal to the second low level.

18. A display apparatus, comprising the display panel according to claim 17.

* * * * *